United States Patent [19]

Mitsuno et al.

[11] Patent Number: 5,409,991
[45] Date of Patent: Apr. 25, 1995

[54] THERMOPLASTIC PROPYLENE RESIN COMPOSITION

[75] Inventors: Tatsuyuki Mitsuno; Takeshi Fujii, both of Chiba; Masashi Yamamoto, Ichihara; Kentaro Yamaguchi, Ichihara; Kiyoshi Mitsui, Ichihara, all of Japan

[73] Assignee: Sumitomo Chemical Company, Limited, Osaka, Japan

[21] Appl. No.: 207,097

[22] Filed: Mar. 8, 1994

Related U.S. Application Data

[60] Division of Ser. No. 918,780, Jul. 27, 1992, Pat. No. 5,312,867, which is a continuation of Ser. No. 395,094, Aug. 17, 1989, abandoned.

[30] Foreign Application Priority Data

Aug. 17, 1988 [JP] Japan ................................ 63-205196
Aug. 17, 1988 [JP] Japan ................................ 63-205197

[51] Int. Cl.$^6$ ....................... C08L 51/04; C08L 51/06
[52] U.S. Cl. ......................................... 525/66; 525/65; 525/69; 525/92 B; 525/93; 525/98; 524/504; 524/505
[58] Field of Search ................... 525/65, 66, 69, 92, 525/93, 98; 524/504, 505

[56] References Cited

U.S. PATENT DOCUMENTS

| | | |
|---|---|---|
| 4,174,358 | 11/1979 | Epstein . |
| 4,628,072 | 12/1986 | Shirahi et al. . |
| 4,720,516 | 1/1988 | Kishida et al. . |
| 4,780,505 | 10/1988 | Mashita et al. . |
| 4,981,896 | 1/1991 | Okada et al. . |
| 5,004,782 | 4/1991 | Mashita et al. . |
| 5,093,404 | 3/1992 | Okada et al. . |
| 5,095,063 | 3/1992 | Okada et al. . |
| 5,185,188 | 2/1993 | Abe et al. . |

FOREIGN PATENT DOCUMENTS

| | | |
|---|---|---|
| 0089042 | 3/1983 | European Pat. Off. . |
| 0180302 | 5/1986 | European Pat. Off. . |
| 0225039 | 10/1986 | European Pat. Off. . |
| 45-30944 | 10/1970 | Japan . |
| 60-262853 | 12/1985 | Japan . |
| 62-158740 | 7/1987 | Japan . |

Primary Examiner—Vasu S. Jagannathan
Attorney, Agent, or Firm—Stevens, Davis, Miller & Mosher

[57] ABSTRACT

A thermoplastic propylene resin composition of the present invention is obtained by blending an epoxy group containing copolymer (G) and a rubber-like material (H) and/or a modified rubber-like material (I) with a resin omposition composed of a polyamide resin (F) and a polypropylene type resin (E).

The thermoplastic propylene resin composition can easily be processed into molded products, films or sheets by injection molding, extrusion molding or the like, giving products which have a good balance in various physical properties and a uniform and smooth appearance. It is suitable for purposes in which especially high heat resistance, impact resistance and low-temperature impact resistance are required.

27 Claims, 1 Drawing Sheet

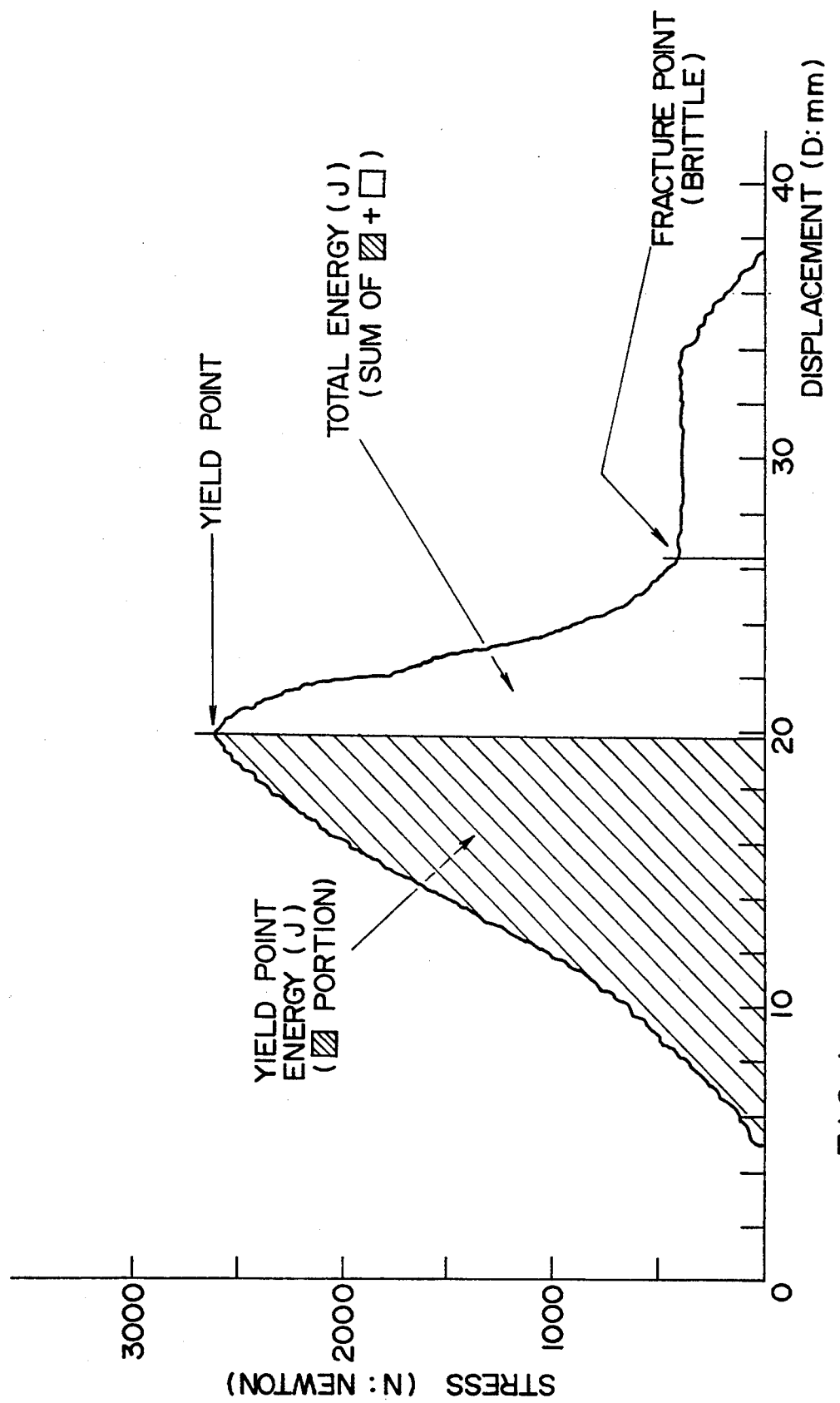

THERMOPLASTIC PROPYLENE RESIN COMPOSITION

This is a division of application Ser. No. 07/918,780, filed Jul. 27, 1992, now U.S. Pat. No. 5,312,867, which in turn is a continuation of application Ser. No. 07/395,094, filed Aug. 17, 1989, now abandoned.

The present invention relates to a novel thermoplastic propylene resin composition which can be utilized in the form of molded articles, sheets, films, etc. by means of injection molding, extrusion molding, etc.

More particularly, the present invention relates to a novel thermoplastic propylene resin composition having excellent balance in physical properties and excellent appearance, which is obtained by blending a polypropylene resin and a polyamide resin with an epoxy group containing polymer.

Polypropylenes have heretofore been widely used in the form of molded articles, films, sheets, etc. because they are excellent in molding processability, toughness, water resistance, gasoline resistance, chemical resistance, etc., have a low specific gravity, and are not expensive.

They, however, are poor or should be improved in heat resistance, stiffness, impact resistance, scratch resistance, coating properties, adhesive properties, printability, etc., and this defect is an obstacle to opening-up of new avenues of practical use for them.

For improving the coating properties, adhesive properties, printability, etc. among the above properties, a method has been devised which comprises subjecting a portion or the whole of a polypropylene to graft modification by use of an unsaturated carboxylic acid or an anhydride thereof, such as maleic anhydride, as disclosed, for example, in JP-B-58-47418 or JP-A-58-49736. However, even the employment of the modified polypropylene thus obtained does not improve physical properties such as impact resistance, heat resistance and stiffness virtually.

On the other hand, polyamide resins are widely used in the fields of automobile parts and electric and electronic parts, as engineering resins having characteristic heat resistance, stiffness, strength, oil resistance and the like, but it is desirable to further improve their molding processability, impact resistance, water resistance, chemical resistance, etc. In addition, they have essential disadvantages in that they have a higher specific gravity and are more expensive than polyolefins.

From such a viewpoint, blending a polypropylene type resin selected from graft polypropylenes or compositions composed of graft polypropylenes and polypropylenes with a polyamide resin would give a thermoplastic resin having the characteristics of both the polypropylene resin and the polyamide resin whose various new uses can be expected.

However, it has heretofore been considered that the compatibility and dispersability between polypropylene resins and polyamide resins are very low. In fact, mere mixing of the above two kinds of resins involves the following problems.

(1) Barus effect of molten polymer is remarkable, so that stable taking-off of extruded strand is substantially impossible, resulting in a marked lowering of the molding workability.

(2) There can be obtained only an injection-molded product which has an extreme nonuniformity, has an ugly appearance owing to formation of flow marks, and cannot be used in practice in automobile parts, electric and electronic parts, etc.

(3) The mechanical properties, in particular, impact resistance, tensile elongation, etc., of a molded product made of a mixture of a polypropylene resin and a polyamide resin often have values lower than those usually expected from the additivity of the respective physical properties of the polypropylene resin and the polyamide resin.

Polypropylenes and polyamides are naturally not compatible with each other, but according to the method disclosed in JP-A-61-64741, a polypropylene resin selected from graft polypropylenes or compositions composed of graft polypropylenes and polypropylenes and a polyamide resin can be made compatible with and dispersable in each other by blending an epoxy group containing copolymer with them. Thus, it is possible to produce a thermoplastic resin composition which has a good balance in physical properties such as molding processability, stiffness, heat resistance, impact resistance, scratch resistance, coating properties, oil resistance, chemical resistance, and water resistance, and is excellent in appearance uniforming and smoothness.

However, in the fields of automobile parts, electric and electronic parts, etc., there is a demand for higher heat resistance and higher impact resistance, in particular, higher low-temperature impact resistance. In order to further improve the heat resistance and impact resistance of the thermoplastic resin composition disclosed in JP-A-61-64741, the present inventors earnestly investigated and consequently accomplished the present invention.

According to the present invention, there are provided a thermoplastic propylene resin composition comprising 100 parts by weight of a resin composition composed of 1 to 99% by weight of a polypropylene type resin (E) selected from the group consisting of a graft polypropylene (A) obtained by graft copolymerizing an unsaturated carboxylic acid or a derivative thereof onto a polypropylene, a graft polypropylene (B) obtained by graft copolymerizing an unsaturated carboxylic acid or a derivative thereof and an unsaturated aromatic monomer onto a polypropylene, a mixture of a graft polypropylene (A) obtained by graft copolymerizing an unsaturated carboxylic acid or a derivative thereof onto a polypropylene and a graft polypropylene (B) obtained by graft copolymerizing an unsaturated carboxylic acid or a derivative thereof and an unsaturated aromatic monomer onto a polypropylene, a mixture of a graft polypropylene (A) obtained by graft copolymerizing an unsaturated carboxylic acid or a derivative thereof onto a polypropylene and a polypropylene (C), a mixture of a graft polypropylene (B) obtained by graft copolymerizing an unsaturated carboxylic acid or a derivative thereof and an unsaturated aromatic monomer onto a polypropylene and a polypropylene (C), and a mixture of a graft polypropylene (A) obtained by graft copolymerizing an unsaturated carboxylic acid or a derivative thereof onto a polypropylene, a graft polypropylene (B) obtained by graft copolymerizing an unsaturated carboxylic acid or a derivative thereof and an unsaturated aromatic monomer onto a polypropylene and a polypropylene (C), and 99 to 1% by weight of a polyamide resin (F), 0.1 to 300 parts by weight of an epoxy group containing copolymer (G), and 0.1 to 300 parts by weight of a rubber-like material (H) and/or a modified rubber-like material (I), the content of the polyamide resin (F) in the thermoplastic propylene resin composition being less than 60% by weight;

a thermoplastic propylene resin composition comprising 100 parts by weight of a graft resin composition (J) obtained by graft copolymerizing an unsaturated carboxylic acid or a derivative thereof onto a mixture of 1 to 99% by weight of a polypropylene (C) and 99 to 1% by weight of a rubber-like material (H), 0.1 to 600 parts by weight of a polyamide resin (F), 0.1 to 300 parts by weight of an epoxy group containing copolymer (G), and optionally up to 1,900 parts by weight of a polypropylene (C), the content of the polyamide resin (F) in the thermoplastic propylene resin composition being less than 60% by weight; and a thermoplastic propylene resin comprising 100 parts by weight of a graft resin composition (K) obtained by graft copolymerizing an unsaturated carboxylic acid or a derivative thereof and an unsaturated aromatic monomer onto a mixture of 1 to 99% by weight of a polypropylene (C) and 99 to 1% by weight of a rubber-like material (H), 0.1 to 600 parts by weight of a polyamide resin (F), 0.1 to 300 parts by weight of an epoxy group containing copolymer (G), and optionally up to 1,900 parts by weight of a polypropylene (C), the content of the polyamide resin (F) in the thermoplastic propylene resin composition being less than 60% by weight.

The polypropylene type resin (E) used in this invention is a resin selected from the group consisting of a graft polypropylene (A), a graft polypropylene (B), a mixture of a graft polypropylene (A) and a graft polypropylene (B), and a composition (D) composed of a graft polypropylene (A) and/or a graft polypropylene (B) and a polypropylene (C).

A detailed explanation of polypropylene is given below.

In the present specification, the word "polypropylene" is used as a starting material for the graft polypropylene (A) or the graft polypropylene (B) in some cases and as the polypropylene (C) in other cases.

In this invention, the polypropylene is a crystalline one and includes, for example, propylene homopolymer; block copolymers obtained by polymerizing propylene at the first step and copolymerizing the resulting polypropylene with ethylene and at least one α-olefin such as propylene or butene-1 at the second step; and random copolymers obtained by copolymerizing propylene with an α-olefin such as ethylene or butene-1.

The homopolymers, block copolymers or random copolymers can be obtained, for example, by reacting the starting materials in the presence of a chemical complex of a titanium trichloride and an alkylaluminum compound which is usually called Ziegler-Natta catalyst.

The polymerization can be carried out at 0° to 300° C. However, preferably, the polymerization is carried out usually in the range of 0° to 100° C., for example, because above 100° C., it becomes difficult for highly stereoregular polymerization of an α-olefin such as propylene to yield a polymer having a high stereoregularity.

Although the polymerization pressure is not critical, it is preferably 3 to 100 atmospheres because such a pressure is industrially practical and economically beneficial.

The polymerization can be carried out by a continuous process or a batch process.

As a method for the polymerization, there can be employed slurry polymerization using an inert hydrocarbon solvent such as butane, pentane, hexane, heptane, or octane; solution polymerization in which the produced polymer is dissolved in the inert hydrocarbon solvent mentioned above; bulk polymerization in which a liquid monomer is polymerized without solvent; and gas phase polymerization in which a gaseous monomer is polymerized.

It is also possible to add a chain transfer agent such as hydrogen in order to control the molecular weight of polymer.

The polypropylene used in this invention can be produced using an isospecific Ziegler-Natta catalyst. The catalyst used herein is preferably the one which has a high isospecificity.

Catalysts which can be suitably used are those containing titanium trichloride having a layer crystal structure or a solid complex of a magnesium compound and a titanium compound as the transition metal constituent and an organoaluminum compound as the typical metal constituent. The catalyst may further contain a well-known electron donative compound as a third component.

Titanium trichloride used can be prepared by reducing titanium tetrachloride with a reducing agent of wide variety. As the reducing agent, metals such as aluminum and titanium, hydrogen, organometal compounds, etc. are known. A typical example of titanium trichloride produced through metal reduction is titanium trichloride composition ($TiCl_3AA$) which is prepared by reducing titanium tetrachloride with metallic aluminum and then pulverizing the reduction product with a ball mill or a vibration mill. Owing to the above process, the $TiCl_3AA$ contains activated aluminum chlorides. For improving the isospecificity, polymerization activity and/or particle shape of the $TiCl_3AA$, a compound selected from the group consisting of ethers, ketones, esters, aluminum chloride, titanium tetrachloride, etc. may be added during the pulverization.

Titanium trichloride more preferable for the object of this invention is the one which is obtained by reducing titanium tetrachloride with an organoaluminum compound, and subjecting the resulting titanium trichloride composition to catalytic reaction with an ether compound and a halogen compound successively or at the same time. As the ether compound, those having the formula $R^1$—O—$R^2$ (each of $R^1$ and $R^2$ is an alkyl group having 1 to 18 carbon atoms), in particular, di-n-butyl ether and di-t-amyl ether, are preferable. The halogen compound is preferably selected from the group consisting of halogens, in particular, iodine; halogen compounds, in particular, iodine trichloride; titanium halides, in particular, titanium tetrachloride; and halogenated hydrocarbons, in particular, carbon tetrachloride and 1,2-dichloroethane. As the organoaluminum compound, those represented by the formula $AlR^3{}_nX_{3-n}$ ($R^3$ is a hydrocarbon group having 1 to 18 carbon atoms, X is a halogen selected from Cl, Br and I, and n is an integer satisfying the inequality $3 \geq n > 1$), in particular, diethylaluminum chloride and ethylaluminum sesquichloride, are preferable.

Processes for producing such titanium trichloride as mentioned above are disclosed in JP-A-47-34470, JP-A-53-33289, JP-A-53-51285, JP-A-54-11986, JP-A-58-142903, JP-A-60-28405, JP-A-60-228504, JP-A-61-218606, etc.

When titanium trichloride having a layer crystal structure is used as the transition metal compound component, organoaluminum compounds represented by the formula $AlR^4{}_mX_{3-m}$ ($R^4$ is a hydrocarbon group having 1 to 18 carbon atoms, X is a halogen selected from Cl, Br and I, and m is a number in the range $3 \geq m > 0$) are preferable as the typical metal compound component. Organoaluminum compounds particularly preferable for the object of this invention are compounds in which $R^4$ is an ethyl or isobutyl group, and m is a number in the range $2.5 \geq m \geq 1.5$. Specific examples of such compounds are diethylaluminum chloride, diethylaluminum bromide, diethylaluminum iodide, and mixtures of these compounds and triethylaluminum or ethylaluminum dichloride. When a third component described later is co-used, organoaluminum compounds in which m is a number in the range $3 \geq m \geq 2.5$ or $1.5 \geq m \geq 0$ can be suitably used for the object of this invention.

The molar ratio of the organoaluminum compound to the titanium trichloride falls within a wide range of 1 to 1,000:1.

The catalyst comprising titanium trichloride and the organoaluminum compound may further contain a third component which is well known. Specific examples of the third component are ε-caprolactam; ester compounds such as methyl methacrylate, ethyl benzoate, methyl toluate, and the like; phosphorus acid esters such as triphenyl phosphite, tributyl phosphite, and the like; and phosphoric acid derivatives such as hexamethyl-phosphoric triamide, and the like.

Although the amount used of the third component should be experimentally determined for each component because the components exhibit different efficiencies, it is usually used in an amount equimolar with or smaller than the amount of the organoaluminum compound.

When a solid complex of a magnesium compound and a titanium compound is used as the transition metal solid component of the catalyst, organoaluminum compounds, in particular, compounds represented by the formula $AlR^5{}_pX_{3-p}$ ($R^5$ is a hydrocarbon group having 1 to 18 carbon atoms, X is a halogen selected from Cl, Br and I, and p is a number in the range $3 \geq p > 2$), are preferable as the typical metal component of the catalyst. Specific examples of such compounds are triethylaluminum, triisobutylaluminum, and mixtures of these compounds with diethylaluminum chloride or diisobutylaluminum chloride.

It is preferable that the catalyst further contains at least one electron-donating compound, in particular, an aromatic monocarboxylic acid ester and/or a silicon compound having Si—$OR^6$ linkage.

As the silicon compound having Si $\geq OR^6$ linkage ($R^6$ is a hydrocarbon group having 1 to 20 carbon atoms), preferably used are alkoxysilane compounds represented by the formula $R^7{}_aSi(OR^6)_{4-a}$ (each of $R^6$ and $R^7$ is a hydrocarbon group having 1 to 20 carbon atoms, and a is a number of $0 \geq a \geq 3$). Specific examples of the alkoxysilane compounds are tetramethoxysilane, methyltrimethoxysilane, dimethyldimethoxysilane, ethyltrimethoxysilane, phenyltrimethoxysilane, tetraethoxysilane, methyltriethoxysilane, ethyltriethoxysilane, vinyltriethoxysilane, phenyltriethoxysilane, diphenyldimethoxysilane, diphenyldiethoxysilane, butyltriethoxysilane, tetrabutoxysilane, vinyltributoxysilane, diethyldiethoxysilane, etc.

The electron-donating compound is used preferably in an amount of 1 mole or less, particularly 0.05 to 1 mole per mole of the organoaluminum compound.

As the solid complex of a magnesium compound and a titanium compound, there is used titanium trichloride containing magnesium chlorides which is obtained by reducing titanium tetrachloride with an organomagnesium compound, or one of the so-called "supported catalyst" prepared by subjecting a solid magnesium compound to catalytic reaction with a liquid titanium compound. Preferably, the solid magnesium compound is a compound containing at least one electron-donating compound, in particular, an aromatic monocarboxylic acid ester, an aromatic dicarboxylic acid diester, an ether compound, an alcohol and/or a phenol. The aromatic monocarboxylic acid ester can be added during the catalytic reaction with a titanium compound.

Such solid complexes of a magnesium compound and a titanium compound are described in many official patent gazettes. Catalysts suitable for the object of this invention are described in detail, for example, in JP-A-54-112988, JP-A-54,119586, JP-A-56-30407, JP-A-57-59909, JP-A-57-59910, JP-A-57-59911, JP-A-57-59912, JP-A-57-59914, JP-A-57-59915, JP-A-57-59916, JP-A-54-112982, JP-A-55-133408, JP-A-58-27704, etc.

When the thermoplastic propylene resin composition of the present invention encounters such requirements as particularly high heat resistance, stiffness, scratch resistance, etc., it is preferable to use a highly crystalline polypropylene having the following properties: an isotactic pentad of boiling heptane insoluble of propylene homopolymer portion of 0.970 or more, wherein the propylene homopolymer portion refers to the homopolymer portion of polypropylene or the homopolymer portion of propylene block copolymer which has been prepared as the first segment in the first step of the block polymerization process; a boiling heptane soluble of not more than 5.0% by weight; a 20° C. xylene soluble of not more than 2.0% by weight.

The isotactic pentad of boiling heptane insoluble, boiling heptane soluble and 20° C. xylene soluble are determined as follows.

In 500 ml of boiling xylene is completely dissolved 5 g of polypropylene, and the resulting mixture is cooled to 20° C. and allowed to stand for 4 hours. Then, the mixture is filtered to remove the 20° C. xylene insoluble. The filtrate is concentrated to dryness to evaporate xylene, and the residue is further dried under reduced pressure at 60° C. to obtain a solidified 20° C. xylene soluble. The 20° C. xylene soluble is determined by dividing the dry weight of the solidified 20° C. xylene soluble by the weight of the sample used and it is represented by percent. The above 20° C. xylene insoluble is dried and then extracted with boiling n-heptane in a Soxhlet apparatus for 8 hours. The extraction residue is referred to as boiling heptane insoluble. The boiling heptane soluble is determined by subtracting the dry weight of the boiling heptane insoluble from the weight of the sample used (5 g) and dividing the remainder by the weight of the sample used. It is also represented by percent.

Isotactic pentad refers to the fraction of a series of five successive isotactically-sequenced propylene monomer units in the total polymer chain. It is determined based on $^{13}$C-NMR measurements as disclosed in A. Zambelli et al., Macromolecules, 6, 925 (1973). And the NMR absorption peaks are assigned based on the subsequently published Macromolecules, 8, 687 (1975).

Specifically, the isotactic pentad is determined based on the relative ratio of the area of mmmm peaks to the total area of the absorption peaks assigned to methyl carbons. Applying the method to the NPL standard substance CRM No. M19-14 Polypropylene PP/MWD/2 provided by the National Physical Laboratory (United Kingdom) gave an isotactic pentad of 0.944.

The above-mentioned highly crystalline polypropylene can be prepared by any of the methods disclosed in JP-A-60-28405, JP-A-60-228504, JP-A-61-218606, JP-A-61-287917, etc.

When the thermoplastic propylene resin composition of the present invention is used for a purpose wherein an impact resistance is required, it is preferable to use a propylene block copolymer, which contains propylene homopolymer portions prepared in the first step as the first segment and block copolymer portions of propylene and an α-olefin such as ethylene and butene-1 prepared in the second step of the block polymerization process as the second segment.

The propylene block copolymer can be prepared by slurry polymerization or gas phase polymerization. When said thermoplastic resin composition is used for a purpose wherein a particularly high impact resistance is required, the amount of the second segment should be increased. In this case, the propylene block copolymer is prepared preferably by gas phase polymerization.

Such a polypropylene having a high impact resistance can be prepared, for example, by the gas phase polymerization disclosed in JP-A-61-287917.

In the propylene block copolymer, the propylene homopolymer portion prepared in the first step of the polymerization may consist of propylene monomer units alone or may consist of propylene monomer units and α-olefin monomer units such as ethylene or an α-olefin having 4 to 6 carbon atoms, wherein the content of the α-olefin monomer units is 6 mole% or less based on the total moles of the monomer units in the polymer produced in the first step. The copolymer portion prepared as the second segment in the second step of the polymerization preferably consists of ethylene monomer units only or consists of propylene monomer units and ethylene monomer units wherein the content of the ethylene monomer units is 10 mole % or more based on the total moles of the monomer units in the polymer produced in the second step or consists of monomer units of propylene, ethylene and an α-olefin having 4 to 6 carbon atoms. The propylene block copolymer contains the polymer produced in the second step, in an amount of 10 to 70% by weight based on the weight of the propylene block copolymer.

The content of the second segment for easy and stable production ranges from 10 to 30% by weight for slurry polymerization and 10 to 70% by weight for gas phase polymerization.

In gas phase polymerization, propylene block copolymers containing a large amount of the second segment can be prepared according to the process disclosed in Japanese. Patent Application No. 62-256015. Such copolymers are suited for the use wherein an extremely high impact resistance is requested.

Although the intrinsic viscosity of the second segment in tetraline at 135° C. should be changed depending on the production efficiency, physical properties of the product powder, and the intrinsic viscosity of the first segment, it is approximately 3-8 dl/g for slurry polymerization and 1-5 dl/g for gas phase polymerization.

In the present invention, the graft polypropylene (A) can be obtained, for example, by graft copolymerizing an unsaturated carboxylic acid or a derivative thereof as a graft monomer onto a polypropylene, if necessary, in the presence of a free-radical initiator, and the graft polypropylene (B) can be obtained, for example, by graft copolymerizing an unsaturated carboxylic acid or a derivative thereof and an unsaturated aromatic monomer as graft monomers onto a polypropylene, if necessary, in the presence of a free-radical initiator.

For grafting the graft monomer(s) on a polypropylene, various conventional methods can be employed.

There can be employed, for example, a method comprising mixing polypropylene, graft monomer(s) and a radical-generating agent followed by melt-kneading the resulting mixture in a melt-kneading apparatus to graft the graft monomer(s); a method comprising dissolving polypropylene in an organic solvent such as xylene, adding thereto a radical generating agent under nitrogen, carrying out the reaction with heating and stirring, thereafter cooling the reaction mixture, followed by washing filtration, and drying, and thereby obtaining a graft polypropylene; a method comprising irradiating polypropylene with ultraviolet light or radiation in the presence of graft monomer(s); and a method comprising bringing polypropylene into contact with oxygen or ozone in the presence of graft monomer(s).

In consideration of economical benefit and the like, it is most preferable to employ the method comprising melt-kneading in a melt-kneading apparatus and thereby carrying out graft copolymerization.

A polypropylene can be melt-kneaded with an unsaturated carboxylic acid or a derivative thereof and if necessary, a free-radical initiator at a temperature of 150° to 300° C., preferably 190° to 280° C. for a residence time of 0.3 to 10 minutes, preferably 0.5 to 5 minutes with an extruder, Banbury mixer, kneader, etc. It is industrially advantageous to employ a method in which a graft polypropylene is continuously produced by a single- or twin-screw extruder while keeping the vent holes vacuous and while removing unreacted components (unsaturated carboxylic acid or derivative thereof, unsaturated aromatic monomer, free-radical initiator, etc.), and by-products such as oligomers and decomposition products of these components. Although the reaction may be carried out in air, it is preferably carried out in an inert gas such as nitrogen or carbon dioxide. It is also possible to subject the graft polypropylene obtained to heat treatment at a temperature of 60° C. or higher, solvent extraction, and drawing a vacuum with melting in order to further remove trace amounts of the unreacted components and the by-products contained in the graft polypropylene.

If necessary, to the graft polypropylene (A) or (B) can be added antioxidants, heat stabilizers, light stabilizers, nucleating agents, lubricants, antistatic agents, inorganic or organic colorants, rust preventives, crosslinking agents, foaming agents, plastisizers, fluorescent agents, surface treating agents, surface brighteners, etc. during the modification or the after-treatment.

The unsaturated carboxylic acid used in the graft polypropylene (A) or (B) include, for example, acrylic acid, methacrylic acid, maleic acid, itaconic acid, citraconic acid, bicyclo[2,2,1]hepta-5-ene-2,3-dicarboxylic acid (himic acid), bicyclo[2,2,2]octa-5-ene-2,3-dicarboxylic acid, 4-methylcyclohexa-4-ene-1,2-dicarboxylic acid, 1,2,3,4,5,8,9,10-octahydronaphthalene-2,3-dicarboxylic acid, bicyclo[2,2,1octa-7-ene-2,3,5,6-tetracarboxylic acid, 7-oxabicyclo[2,2,1]hepta-5-ene-2,3-dicarboxylic acid and the like. The derivatives thereof are acid anhydrides, esters, amides, imides and metal salts. Specific examples thereof are maleic anhydride, itaconic anhydride, citraconic anhydride, bicyclo[2,2,1]hepta-5-ene-2,3-dicarboxylic acid anhydride (himic acid anhydride: NBDA), monoethyl maleate, monomethyl fumarate, monomethyl itaconate, dimethylaminoethyl methacrylate, dimethylaminopropyl acrylamide, acrylamide, methacrylamide, maleic monoamide, maleic diamide, maleic N-monoethylamide, maleic N,N-dimethylamide, maleic N-monobutylamide, maleic N,N-dibutylamide, fumaric monoamide, fumaric diamide, fumaric N-monoethylamide, fumaric N,N-diethylamide, fumaric N-monobutylamide, fumaric N, N-dibutylamide, maleimide, N-butyl maleimide, N-phenyl maleimide, sodium acrylate, sodium methacrylate, potassium acrylate, potassium methacrylate and the like.

Of these, maleic anhydride is most preferably used.

As the unsaturated aromatic monomer used in the graft polypropylene (B), styrene is most preferable. These can be also used o-methylstyrene, p-methylstyrene, α-methylstyrene, vinyltoluene, divinylbenzene and mixtures thereof.

Although the graft polypropylene (A) or (B) can be produced in the absence of a free-radical initiator, it is usually preferably produced in the presence of a free-radical initiator. As the free-radical initiator, well known ones can be used. The free-radical initiator includes, for example, azo compounds such as 2,2'-azobisisobutyronitrile, 2,2'-azobis(2,4,4-trimethylvaleronitrile), etc.; organic peroxides such as methyl ethyl ketone peroxide, cyclohexanone peroxide, 3,5,5-trimethylcyclohexanone peroxide, 2,2-bis(t-butylperoxy)butane, t-butyl hydroperoxide, cumen hydroperoxide, diisopropylbenzene hydroperoxide, 2,5-dimethylhexane-2,5-dihydroperoxide, di-t-butyl peroxide, 1,3-bis(t-butylperoxyisopropyl)benzene, 2,5-dimethyl-2,5-di(t-butylperoxy)hexane, 2,5-dimethyl-2,5-di(t-butylperoxy)hexyne-3, lauroyl peroxide, 3,3,5-trimethylhexanoyl peroxide, benzoyl peroxide, t-butyl peracetate, t-butylperoxyisobutyrate, t-butylperoxypivalate, t-butylperoxy-2-ethylhexanoate, t-butylperoxy-3,5,5-trimethylhexanoate, t-butylperoxylaurate, t-butylperoxybenzoate, di-t-butyldiperoxyisophthalate, 2,5-dimethyl-2,5-di(benzoylperoxy)hexane, t-butylperoxymaleic acid, t-butylperoxyisopropylcarbonate, polystyrene peroxide and the like.

In producing the graft polypropylene (A) or (B), the melt flow rate of a starting polypropylene (a crystalline propylene homopolymer, a crystalline propylene-ethylene/α-olefin block copolymer, a crystalline propylene α-olefin random copolymer, or the like) is 0.05–60 g/10 rain, preferably 0.1–40 g/10 min. The starting polypropylene is preferably chosen so as to adjust the melt flow rate of the resulting graft polypropylene (A) or (B) to 0.1–100 g/10 min, preferably 0.5–50 g/10 min. The number average molecular weight of the starting polypropylene is 7,000 to 800,000, preferably 10,000 to 700,000.

In producing the graft polypropylene (A) or (B), the blending amounts of the individual constituents are as follows. The amount of the unsaturated carboxylic acid or derivative thereof is preferably 0.01 to 10 parts by weight, more preferably 0.1 to 5 parts by weight per 100 parts by weight of the polypropylene. The amount of the unsaturated aromatic monomer is preferably 0.01 to 10 parts by weight, more preferably 0.1 to 5 parts by weight per 100 parts by weight of the polypropylene. The amount of the free-radical initiator is preferably 0 to 5 parts by weight, more preferably 0.001 to 2 parts by weight per 100 parts by weight of the polypropylene. When the amount of the unsaturated carboxylic acid or derivative thereof or the unsaturated aromatic monomer is less than 0.01 part by weight, the product has no markedly improved quality. When it exceeds 10 parts by weight, the improvement hits the ceiling and no more remarkable effect is brought about. Moreover, the unsaturated carboxylic acid or derivative thereof or the unsaturated aromatic monomer remains unreacted in a large amount in the resulting polymer and as a result, offensive smell, deterioration of physical properties, etc. occurs. Therefore, both of such amounts are not desirable for practical purposes. When the amount of the free-radical initiator exceeds 5 parts by weight, its effect on the graft reaction of the unsaturated carboxylic acid or derivative thereof hits the ceiling. Moreover, the decomposition of the polypropylene becomes so serious that the fluidity (melt flow rate) changes greatly. Therefore, such an amount is not desirable for practical purposes.

Although the amount of the unsaturated carboxylic acid or derivative thereof added in the graft polypropylene (A) or (B) is not critical, it is usually 0.05 to 0.20% by weight, preferably 0.08 to 0.15% by weight. Although the amount of the unsaturated aromatic monomer added in the graft polypropylene (B) is not critical, it is usually 0.05 to 0.10% by weight, preferably 0.06 to 0.08% by weight.

In this invention, the polypropylene type resin (E) selected from the group consisting of a graft polypropylene (A), a graft polypropylene (B), a mixture of a graft polypropylene (A) and a graft polypropylene (B), and a composition (D) composed of a graft polypropylene (A) and/or a graft polypropylene (B) and a polypropylene (C), has a melt flow rate of preferably 0.1–100 g/10 min, more preferably 0.5–40 g/min, most preferably 10–40 g/10 min.

The polyamide resin (F) in the present invention is a polyamide obtained by polymerization of a lactam having a ring composed of three or more members or a polymerizable ω-amino acid or by polycondensation of a dibasic acid and diamine. Specific examples of the polyamide resin (F) are polymers of ε-caprolactam, aminocaproic acid, enantholactam, 7-aminoheptanoic acid, 11-aminoundecanoic acid, etc.; polymers obtained by polycondensation of a diamine such as hexamethylenediamine, nonamethylenediamine, undecamethylenediamine, dodecamethylenediamine, methaxylylenediamine or the like and a dicarboxylic acid such as terephthalic acid, isophthalic acid, adipic acid, sebacic acid, dodecane dibasic acid, glutaric acid or the like; and copolymers of the above monomers.

More specific examples of the polyamide resin (F) are aliphatic polyamides such as poly-ε-caprolactam (Nylon 6), polyhexamethylene adipamide (Nylon 66), polyhexamethylene sebacamide (Nylon 610 ), poly-11-aminoundecanoic acid (Nylon 11), polylauric lactam (Nylon 12), polyhexamethylene dodecanoamide (Nylon 612), etc., and aromatic polyamides such as polyhexamethylenediamine terephthalamide, polyhexamethylenediamine isophthalamide, xylene-group-containing polyamides, etc. These polyamides can be used alone or as a mixture thereof. Copolymers of the above-exemplified monomers can also be used. The polyamide resin (F) is preferably poly-ε-caprolactam or polyhexamethylene adipamide.

The epoxy group containing copolymer (G) in the present invention is a copolymer obtained from an unsaturated epoxy compound and an ethylenic unsaturated compound.

Although the proportions of these compounds for the epoxy group containing copolymer (G) is not critical, the proportion of the unsaturated epoxy compound is preferably 0.1 to 50% by weight, more preferably 1 to 30% by weight, most preferably 10 to 25% by weight.

As the unsaturated epoxy compound, any compound may be used so long as it has in the molecule an unsaturated group which permits copolymerization with the ethylenic unsaturated compound and an epoxy group.

The unsaturated epoxy compound includes, for example, unsaturated glycidyl esters and unsaturated glycidyl ethers which are represented by the following formulas (1) and (2), respectively.

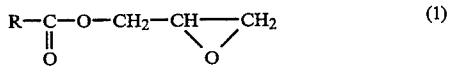

wherein R is a hydrocarbon group of 2–18 carbon atoms containing an ethylenic unsaturated bond.

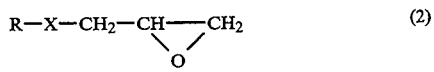

wherein R is a hydrocarbon group of 2–18 carbon atoms containing an ethylenic unsaturated bond, and X is

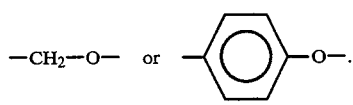

Specific examples of the unsaturated epoxy compound are glycidyl acrylate, glycidyl methacrylate, glycidyl itaconate, allyl glycidyl ether, 2-methyl allyl glycidyl ether, styrene p-glycidyl ether, etc. Of these, glycidyl methacrylate is preferable.

Specific examples of the ethylenic unsaturated compound are olefins, vinyl esters of saturated carboxylic acids of 2–6 carbon atoms, esters of saturated alcohols of 1–8 carbon atoms and acrylic acid, methacrylic acid, maleic acid or fumaric acid, vinyl halides, styrenes, nitriles, vinyl ethers, acrylamides, etc.

Specific examples of the ethylenic unsaturated compound are ethylene, propylene, butene-1, vinyl acetate, methyl acrylate, ethyl acrylate, methyl methacrylate, dimethyl maleate, diethyl fumarate, vinyl chloride, vinylidene chloride, styrene, acrylonitrile, isobutyl vinyl ether, acrylamide, etc. Of these, ethylene is particularly preferred.

For improving the impact resistance at low temperatures by lowering the glass transition temperature, it is preferable to use ethylene as the second monomer and copolymerize a third monomer such as vinyl acetate and methyl acrylate.

Although the amount of the third monomer copolymerized is not critical, it is usually 20% by weight or less, preferably 5 to 15% by weight.

The epoxy group containing copolymer can be produced by various methods. There can be employed either a random copolymerization method in which the unsaturated epoxy compound is introduced into the main chain of copolymer, or a graft copolymerization method in which the unsaturated epoxy compound is introduced as the side chain of copolymer. Specific examples of production process of the epoxy group containing copolymer are a process comprising copolymerizing the unsaturated epoxy compound with ethylene in the presence of a radical-generating agent at 500 to 4,000 atmospheres and at 100° to 300° C. in the presence or absence of suitable solvent and chain transfer agent; a process comprising mixing a polypropylene with the unsaturated epoxy compound and a radical-generating agent, and subjecting the mixture to melt graft copolymerization in an extruder; and a process comprising copolymerizing the unsaturated epoxy compound with the ethylenic unsaturated compound in an inert medium such as water or organic solvent in the presence of a radical-generating agent.

As the rubber-like material (H) used in this invention for improving the impact resistance, in particular, the low-temperature impact resistance, there can be used, for example, ethylenic copolymer rubbers, propylene-butene rubber, isoprene-butylene rubber, polyisoprenes, polybutadienes, styrene block copolymers such as styrene-butadiene rubber, styrene-butadiene-styrene block copolymers, partially hydrogenated styrene-butadiene block copolymers, styrene-isoprene block copolymers, partially hydrogenated styrene-isoprene block copolymers and the like, linear low-density polyethylenes, and blends thereof.

As the ethylenic copolymer rubber, there can be used various ethylenic copolymer rubbers, for example, ethylene-α-olefin copolymer rubbers or ethylene-α-olefin-nonconjugated diene copolymer rubbers, typical examples of which are ethylene-propylene copolymer rubbers (hereinafter abbreviated as "EPM") and ethylene-propylene-nonconjugated diene copolymer rubbers (hereinafter abbreviated as "EPDM"), ethylene-vinyl acetate copolymers, ethylene-methyl acrylate copolymers, ethylene-methyl methacrylate copolymers, ethylene-ethyl acrylate copolymers, ethylene-ethyl methacrylate copolymers, ethylene-butyl acrylate copolymers, ethylene-butyl methacrylate copolymers, ethylene-acrylic acid (or a partial metal salt thereof) copolymers, ethylene-methacrylic acid (or a partial metal salt thereof) copolymers, ethylene-acrylic acid-acrylic ester copolymers, ethylene-methacrylic acid-acrylic ester copolymers, ethylene-acrylic acid-methacrylic ester copolymers, ethylene-methacrylic acid-methacrylic ester copolymers, ethylene-vinyl alcohol copolymers, ethylene-vinyl acetate-vinyl alcohol copolymers, ethylene-styrene copolymers, etc. Of these, ethylene-propylene copolymer rubber is preferable. These ethylenic copolymer rubbers can be used alone or as a mixture thereof. They can be used in admixture with low-density polyethylenes or high-density polyethylenes which have a good compatibility with the ethylenic copolymer rubbers.

Although the number average molecular weight of these rubber-like materials is not critical, it is usually 10,000 to 100,000, preferably 50,000 to 60,000.

The modified rubber-like material (I) is a product obtained either by graft copolymerizing an unsaturated carboxylic acid or a derivative thereof or a combination of an unsaturated carboxylic acid or a derivative thereof and an unsaturated aromatic monomer onto the rubber-like material (H), if necessary, in the presence of a free-radical initiator, or by introducing an unsaturated carboxylic acid or a derivative thereof into the α-olefin main chain by direct copolymerization in the presence of a polymerization initiator and a catalyst.

As the rubber-like material (H) and a starting rubber-like material for the modified rubber-like material (I), ethylene copolymers and styrene block copolymers are suitably used.

Among ethylene copolymers, ethylene-α-olefin copolymer rubbers and ethylene-α-olefin-nonconjugated diene copolymer rubbers are particularly preferred. Specific examples of ethylene-α-olefin copolymer rubbers are copolymers of ethylene and other α-olfein such as propylene, 1-butene, 1-pentene, 1-hexene, 4-methyl-1-pentene, 1-octene, etc., and terpolymer rubbers such as ethylene-propylene-1-butene copolymers and the like. Of these, ethylene-propylene copolymer rubber and ethylene-1-butene copolymer rubber are preferably used.

Although ethylene-α-olefin-nonconjugated diene copolymer rubbers can also be used, it is preferable to adjust the nonconjugated diene content of the starting rubber to 3% by weight or less. When the nonconjugated diene content exceeds 3% by weight, gelation occurs during kneading. Therefore, it is not desirable.

The ethylene content of the ethylene-α-olefin copolymer rubber is 15 to 85% by weight, preferably 40 to 80% by weight. A highly crystalline copolymer having an ethylene content of more than 85% by weight is apt to become difficult to process under usual rubber molding conditions. On the other hand, an ethylene-α-olefin copolymer rubber having an ethylene content of less than 15% by weight is apt to lose its rubber properties because the glass transition temperature (Tg) increases.

The number average molecular weight of the ethylene-α-olefin copolymer rubber is preferably such that the rubber can be kneaded in an extruder, and it is usually 10,000 to 100,000. When the molecular weight is too low, handling of the rubber at the time of feeding to an extruder tends to be difficult. When the molecular weight is too high, processing of the rubber tends to be difficult due to the lowering of the fluidity.

The molecular weight distribution of the ethylene-α-olefin copolymer rubber is not critical, and there can usually be used any commercially available copolymer rubbers having various molecular weight distributions, for example, monomodal distribution and bimodal distribution.

The Q value (weight average molecular weight/number average molecular weight) of the molecular weight distribution is preferably in the range of 1 to 30, more preferably 2 to 20.

Said copolymer rubber is produced using one of the so-called Ziegler-Natta catalysts which are usually used production catalysts. As the Ziegler-Natta catalyst, there is used, for example, a combination of an organo-aluminum compound and a trivalent to pentavalent vanadium compound soluble in hydrocarbon solvents. As the aluminum compound, there can be used alkylaluminum sesquichloride, trialkylaluminum, dialkylaluminum monochloride, and mixtures thereof. As the vanadium compound, there can be used, for example, vanadium oxytrichloride, vanadium tetrachloride, and vanadate compound represented by the formula VO-$(OR^8)_q X_{3-q}$ ($0 < q \leq 3$, $R^8$ is a straight-chain, branched-chain, or cyclic hydrocarbon having 1 to 10 carbon atoms, and X is a halogen selected from Cl, Br and I).

Among styrene block copolymers, partially hydrogenated styrene-butadiene block copolymers are particularly preferred. The partially hydrogenated styrene-butadiene block copolymers are produced by partial hydrogenation of styrene-butadiene block copolymers. Their structure and production process are described below.

In the partially hydrogenated styrene-butadiene block copolymers, the number average molecular weight of block copolymer rubber is 10,000 to 1,000,000, preferably 20,000 to 300,000; the number average molecular weight of unsaturated aromatic polymer block A in the block copolymer rubber is 1,000 to 200,000, preferably 2,000 to 100,000; the number average molecular weight of conjugated diene polymer block B is 1,000 to 200,000, preferably 2,000 to 100,000; and the weight ratio of unsaturated aromatic polymer block A to conjugated diene polymer B is 2/98 to 60/40, preferably 10/9 to 40/60.

Many processes have been proposed for producing block copolymer rubbers. As a typical process, the process disclosed in JP-B-40-23798 can yield a block copolymer rubber of an unsaturated aromatic hydrocarbon and a diene hydrocarbon by block polymerization in an inert solvent by the use of lithium catalyst or Ziegler-Natta catalyst.

Such a block copolymer rubber is hydrogenated in an inert solvent in the presence of a hydrogenation catalyst, for example, by any of the methods disclosed in JP-B-42-8704, JP-B-43-6636, JP-B-46-20814, etc. The hydrogenation rate is such that at least 50%, preferably 80% or more, of the polymer block B is hydrogenated and that 25% or less of aromatic unsaturated bonds in the polymer block A are subjected to nuclear hydrogenation. A typical example of the thus partially or completely hydrogenated block copolymer is KRATON ®-G (a trade name) commercially available from Shell Chemical Co., U.S.A.

In producing the modified rubber-like material (I), various conventional methods can be employed for graft copolymerizing the graft monomer(s) onto a starting rubber-like material.

There can be employed, for example, a method comprising mixing a starting rubber-like material, graft monomer(s) and a radical generating agent followed by melt kneading the resulting mixture in a melt-kneading apparatus to graft the graft monomer(s); a method comprising dissolving a starting rubber-like material in an organic solvent such as xylene, adding thereto a radical-generating agent under nitrogen, carrying out the reaction with heating and stirring, thereafter cooling the reaction mixture, followed by washing, filtering, and drying, and thereby obtaining a graft rubber-like material; a method comprising irradiating a starting rubber-like material with an ultraviolet light or radiation in the presence of graft monomer(s); and a method comprising bringing a starting rubber-like material into contact with oxygen or ozone in the presence of graft monomer(s).

In consideration of economical benefit, it is most preferable to employ the method comprising melt-kneading in a melt-kneading apparatus and thereby carrying out graft copolymerization.

In this invention, the modified rubber-like material (I) can be obtained by melt-kneading the starting rubber-like material with an unsaturated carboxylic acid or a derivative thereof and if necessary, a free-radical initiator or with an unsaturated carboxylic acid or a derivative thereof, an unsaturated aromatic monomer and if necessary, a free-radical initiator at a temperature of 200° to 280° C., preferably 230° to 260° C. for a residence time of 0.2 to 10 minutes, which varies depending on the kind of the free-radical initiator, with an extruder, Banbury mixer, kneader, or the like.

Since the presence of too large an amount of oxygen during the kneading results in formation of a gel or serious coloring in some cases, the kneading is preferably conducted in the substantial absence of oxygen.

When the kneading temperature is lower than 200° C., no desired amount of unsaturated dicarboxylic acid anhydride added can be attained, so that a small improving effect on the degree of graft reaction can be obtained in some cases. When the kneading temperature is higher than 280° C., only small improving effect on the degree of graft reaction is brought about and in some cases, formation of a gel, coloring, etc. are liable to occur.

Although a kneading machine for the modification is not critical, an extruder is usually preferred because it permits continuous production. The extruder preferably has a single screw or twin screws which are suitable for uniformly mixing fed starting materials.

For removing unreacted constituents (unsaturated carboxylic acid or derivative thereof, unsaturated aromatic monomer, free-radical initiator, etc.), by-products such as their oligomers and decomposition products from the reaction product, the product can be purified by sucking through vent lines in the middle of the extruder or near its outlet with a vacuum pump, or by dissolution of the product in a suitable solvent, followed by deposition. It is also possible to conduct heat treatment at a temperature of 60° C. or higher, or draw a vacuum with melting.

Although the above three or four components can be separately fed to a kneading machine, it is also possible to use a previously prepared uniform mixture of some or all of the three or four components. For example, there can be employed a method which comprises impregnating the rubber-like material with the free-radical initiator and the unsaturated aromatic monomer, feeding the rubber-like material, unsaturated carboxylic acid or derivative thereof and the like at the same time at the time of kneading, and kneading them. There can also be employed, for example, a method which comprises feeding the free-radical initiator and/or the unsaturated carboxylic acid or derivative thereof in the middle of the extruder, and thereby conducting modification.

If necessary, to the modified rubber-like material (I) can be added antioxidants, heat stabilizers, light stabilizers, nucleating agents, lubricants, antistatic agents, inorganic or organic colorants, rust preventives, crosslinking agents, foaming agents, plasticizers, fluolescent agents, surface treating agents, surface brighteners and the like during the modification or the after-treatment.

The unsaturated carboxylic acid or derivative thereof and the free-radical initiator which are used in the modified rubber-like material can be selected from the compounds used for producing the graft polypropylene (A). As the unsaturated aromatic monomer, styrene is most preferable. There can be also used o-methylstyrene, p-methylstyrene, α-methylstyrene, vinyltoluene, divinylbenzene and mixtures thereof.

In producing the modified rubber-like material (I), the unsaturated aromatic monomer is used for preventing gel formation and improving the degree of graft reaction. The amounts used of the unsaturated aromatic monomer and the unsaturated carboxylic acid or derivative thereof are preferably 0.2 to 20 parts by weight and 0.5 to 15 parts by weight, respectively, per 100 parts by weight of the starting rubber-like material. When the aromatic monomer is used, the amount used of the unsaturated carboxylic acid or derivative thereof is preferably 0.5 to 15 parts by weight, and the weight ratio of the unsaturated aromatic monomer to the unsaturated carboxylic acid or derivative thereof is preferably 0.1 to 3.0, more preferably 0.5 to 2.0.

When the weight ratio of the unsaturated aromatic monomer to the unsaturated carboxylic acid or derivative thereof is less than 0.1, there is brought about no desirable effect on prevention of gel formation and improvement of the degree of graft reaction in some cases. When the weight ratio exceeds 3.0, the effect hits the ceiling in some cases.

Although the amount used of the free-radical initiator depends on the kind thereof and the kneading conditions, the free-radical initiator can be used in an amount of usually 0.005 to 1.0 part by weight, preferably 0.01 to 0.5 part by weight, per 100 parts by weight of the starting rubber-like material. When the amount used is less than 0.005 part by weight, it is difficult to attain a desirable amount of the unsaturated carboxylic acid or derivative thereof added, and in some cases, the effect of increasing the amount of the unsaturated carboxylic acid or derivative thereof added, by the co-use of the unsaturated aromatic monomer, is lessened. When the amount used exceeds 1.0 part by weight, formation of a gel tends to occur.

Although the amount of the unsaturated carboxylic acid or derivative thereof added in the modified rubber-like material (I) is not critical, it is usually 0.1 to 5% weight, preferably 0.5 to 1.5% by weight. Although the amount of the unsaturated aromatic monomer added in the modified rubber-like material (I) is not critical, it is usually 0.1 to 5% by weight, preferably 0.5 to 1.0% by weight. Although the Mooney viscosity ($ML_{1+4}$, 121° C.) of the modified rubber-like material (I) is not critical, it is usually 5 to 120, preferably 40 to 80.

For producing the modified rubber-like material (I), there can be used another process which comprises introducing the unsaturated carboxylic acid or derivative thereof into the main chain by copolymerization in the presence of a polymerization initiator and a catalyst. In general, the modified rubber-like material (I) can be produced by the conventional high-pressure radical polymerization described below. It can be obtained by copolymerizing ethylene with a monomer radical-copolymerizable therewith (a comonomer) by the use of a radical-generating agent such as organic peroxide, oxygen or the like. The copolymerization reaction is carried out usually at a polymerization temperature of 130° to 300° C. and a polymerization pressure of 500–3,000 kg/cm².

Specific examples of the radical-copolymerizable monomer are unsaturated carboxylic acids such as acrylic acid, methacrylic acid, etc. and esterified products thereof, vinyl esters such as vinyl acetate, etc. Specific examples of the esterified products of unsaturated carboxylic acids are methyl acrylate, ethyl acrylate, methyl methacrylate and glycidyl methacrylate. These comonomers can be used alone or in combination of two or more thereof.

The content of the comonomer in the modified rubber-like material (I) obtained by direct copolymerization is 0.1 to 40% by weight, preferably 1 to 35% by weight. When the content of the comonomer is less than 0.1% by weight, the product has no markedly improved quality.

Of these copolymers, ethylene-acrylic acid copolymers and ethylene-methacrylic acid copolymers are preferred. However, the copolymers exemplified above as the rubber-like material (H) and starting rubber-like materials for the modified rubber-like material (I) are excluded.

The graft resin compositions (J) and (K) are compositions prepared by co-grafting by adding an unsaturated carboxylic acid or a derivative thereof, or a combination of an unsaturated carboxylic acid or a derivative thereof and an unsaturated aromatic monomer, respectively, to both a starting polypropylene and a starting rubber-like material.

The co-grafting can be conducted by graft copolymerizing an unsaturated carboxylic acid or a derivative thereof, or a combination of an unsaturated carboxylic acid or a derivative thereof and an unsaturated aromatic monomer, onto both a starting polypropylene and a starting rubber-like material, if necessary, in the presence of a free radical initiator by the same process as used for producing each of the graft polypropylene (A), the graft polypropylene (B) and the modified rubber-like material (I). In the co-grafting, ethylenic copolymer rubber or partially hydrogenated styrene-butadiene block copolymers are most preferable as the starting rubber-like material.

For placing the starting polypropylene and the starting rubber-like material together, there can be employed the following various conventional methods. When both starting materials are pellets, powder, or ground products, there can be employed, for example, a method comprising feeding the starting materials to a co-modifying apparatus such as an extruder separately or through the same feed opening, and thereby placing them together in the apparatus; and a method comprising premixing the starting materials uniformly with a simple mixer such as tumbler or Henschel mixer. When either of the starting materials is a large solid such as veil, there can be employed, for example, a conventional method comprising melt-kneading the starting materials with a batch melt-kneading apparatus such as roll mill, kneader or Banbury mixer to have homogenized them previously, and pelletizing or grinding the resulting mixture to facilitate feeding to a co-modifying apparatus.

The starting polypropylene and the starting rubber-like material may not be m&rely mixed. They can be subjected to co-grafting by the same graft polymerization process as used for obtaining the graft polypropylene (A) or (B) or for obtaining the modified rubber-like material (I).

Although in the co-grafting, the blending proportions of the starting polypropylene and the starting rubber-like material can be properly chosen, they are preferably determined in consideration of the proportions between the graft polypropylene (A), the graft polypropylene (B) and the modified rubber-like material (I) in the thermoplastic propylene resin composition of the present invention.

In the co-grafting, the amount of the unsaturated carboxylic acid or derivative thereof is preferably 0.01 to 20 parts by weight, more preferably 0.1 to 5 parts by weight, per 100 parts by weight of the sum of the starting polypropylene and the starting rubber-like material, the amount of the unsaturated aromatic monomer optionally used is preferably 0.01 to 15 parts by weight, more preferably 0.1 to 5 parts by weight, per 100 parts by weight of the sum of the starting polypropylene and the starting rubber-like material, and the weight ratio of the unsaturated aromatic monomer to the unsaturated carboxylic acid or derivative thereof is preferably 0.1 to 3.0, more preferably 0.5 to 2.0. If necessary, a free-radical initiator can be used in an amount of preferably up to 5 parts by weight, more preferably 0.001 to 2 parts by weight.

For dispersing the starting polypropylene and the starting rubber-like material while subjecting them to co-grafting dynamically, it is preferable to use a high-kneading melt-kneading apparatus such as high-kneading twin screw extruder.

Although the amount of the unsaturated carboxylic acid or derivative thereof added in the graft resin compositions (J) and (K) is not critical, it is usually 0.10 to 0.50% by weight, preferably 0.20 to 0.45% by weight. Maleic anhydride is preferable as the unsaturated carboxylic acid or derivative thereof. Although the melt flow rate of the graft resin compositions (J) and (K) is not critical, it is usually 5–50 g/10 min, preferably 10–20 g/10 min. Although the amount of the unsaturated aromatic monomer added in the graft resin composition (K) is not critical, it is usually 0.5% by weight or less, preferably 0.1 to 0.3% by weight. Styrene is preferable as the unsaturated aromatic monomer.

In this invention, in producing the thermoplastic propylene resin composition, a filler (L) can be blended for reinforcement, impartment of functions, extention (for reducing the manufacturing cost), etc.

As the filler (L), there can be used fibers such as glass fiber, carbon fiber, polyamide fiber, metal fibers of aluminum, stainless steel and the like, metal whiskers, etc., inorganic fillers such as silica, alumina, calcium carbonate, talc, mica, clay, kaolin, carbon black, $TiO_2$, ZnO, $Sb_2O_3$, etc.

All of these fillers can be used for reinforcement. Fillers such as carbon fiber, metal fibers and carbon black can lower the surface resistivity and the volume resistivity and impart electrical conductivity to the thermoplastic propylene resin composition of the present invention. The manufacturing cost can be reduced by using a filler less expensive than the resins as an extender.

For improving the stiffness and heat resistance of the thermoplastic propylene resin composition of the present invention, it is particularly preferable to use as the filler (L), an inorganic filler such as glass fiber, potassium titanate whisker, talc, mica, calcium carbonate or the like, or carbon fiber.

One preferable embodiment of the present invention is to use the thermoplastic propylene resin composition of the present invention in the form of composite materials obtained by further adding flame retardants or flame-retarding assistants, lubricants, nucleating agents, plasticizers, dyes, pigments, antistatic agents, antioxidants, weather resistance improvers, etc.

In the resin composition composed of a polypropylene type resin and a polyamide resin in the thermoplastic propylene resin composition of the present invention, the polypropylene type resin (E) is contained in an amount of 1 to 99% by weight, preferably 20 to 98% by weight, more preferably 25 to 80% by weight, based on the weight of the resin composition. When the content of the polypropylene type resin (E) is less than 1% by weight, the molding processability, toughness, water resistance, chemical resistance, and the like are not sufficient.

When a composition composed of a graft polypropylene (A) and/or a graft polypropylene (B) and a polypropylene (C) is used as the polypropylene type resin (E), the graft polypropylene (A) or the graft polypropylene (B), or both, are preferably contained in the composition in an amount of 5% by weight or more based on the weight of the composition. When the content is less than 5% by weight, the final resin composition tends to be poor in compatibility and dispersibility, and it is difficult to attain sufficient toughness and impact resistance. Moreover, improvement of the coating properties, adhesive properties, printability and the like are not sufficient in some cases.

In the thermoplastic propylene resin composition of the present invention, the polyamide resin (F) is contained in an amount of less than 60% by weight, preferably 50 to 2% by weight, more preferably 50 to 10% by weight, based on the thermoplastic propylene resin composition. The polyamide resin (F) has an improving effect on the heat resistance, stiffness, strength and the like, but when its content exceeds 60% by weight, there cannot be attained desirable molding processability, toughness, water resistance, chemical resistance and the like. Furthermore, the specific gravity is increased and the manufacturing cost is raised.

In the present invention, the epoxy group containing copolymer (G) is blended in an amount of 0.1 to 300 parts by weight, preferably 1 to 200 parts by weight, more preferably 1 to 135 parts by weight, per 100 parts by weight of the resin composition composed of the polypropylene type resin (E) and the polyamide resin (F). When the blending amount is less than 0.1 part by weight, the resin composition is poor in compatibility and dispersibility. Moreover, the toughness and the impact resistance are not sufficient and the extrusion stability is low. Even when it is 100 parts by weight or more, the resulting thermoplastic propylene resin composition is useful as a thermoplastic elastomer, but when the blending amount exceeds 300 parts by weight, the toughness, heat resistance and the like are greatly deteriorated and no desirable result can be obtained.

The rubber-like material (H) or the modified rubber-like material (I) used in the thermoplastic propylene resin composition of the present invention for the purpose of improving the impact resistance, in particular, the low-temperature impact resistance, is blended in an amount of 0.1 to 300 parts by weight, preferably 1 to 200 parts by weight, more preferably 20 to 160 parts by weight, per 100 parts by weight of the resin composition composed of the polypropylene type resin (E) consisting of the graft polypropylene (A) and/or the graft polypropylene (B) or consisting of the graft polypropylene (A) and/or the graft polypropylene (B) and a polypropylene (C), and the polyamide resin (F). When the blending amount is less than 0.1 part by weight, no impact resistance improving effect is brought about. Even when it is 100 parts by weight or more, the resulting thermoplastic propylene resin composition is useful as a thermoplastic elastomer, but when it exceeds 300 parts by weight, the toughness, heat resistance and the like are seriously deteriorated and no desirable result can be obtained.

In the graft resin composition (J) or (K) in the thermoplastic propylene resin composition of the present invention, an unsaturated carboxylic acid or a derivative thereof, or a combination of an unsaturated carboxylic acid or a derivative thereof and an unsaturated aromatic monomer is graft copolymerized, respectively, onto a mixture of 1 to 99% by weight, preferably 20 to 98% by weight, of a polypropylene (C) and 99 to 1% by weight, preferably 98 to 20% by weight, of a rubber-like material (H). When the amount of the rubber-like material (H) is less than 1% by weight, no impact resistance improving effect is brought about. When the amount of the polypropylene (C) is less than 1% by weight, the molding processability, toughness, water resistance, chemical resistance and the like are not sufficient.

Polypropylene (C) is optionally blended in an amount of 1,900 parts by weight or less per 100 parts by weight of the graft resin composition (J) or (K). In this case, it is preferable that graft polypropylene is contained in the graft resin composition (J) or (K) in an amount of 5% by weight or more based on the total weight of graft polypropylene and polypropylene (C) contained therein. When the content is less than 5% by weight, the final resin composition tends to be poor in compatibility and dispersibility, and it is difficult to attain sufficient toughness and impact resistance. Moreover, improvement Of the coating properties, adhesive properties and printability is not sufficient in some cases.

In the present invention, a polyamide resin is blended in an amount of 0.1 to 600 parts by weight, preferably 2 to 500 parts by weight, per 100 parts by weight of the graft resin composition (J) or (K). Its amount is less than 60% by weight, preferably 50 to 2% by weight, more preferably 50 to 10% by weight, based on the weight of the whole thermoplastic propylene resin composition. When the amount exceeds 60% by weight, there cannot be attained desirable molding processability, toughness, water resistance and chemical resistance. Furthermore, the manufacturing cost is raised. In addition, an epoxy group containing copolymer (G) is blended in an amount of 0.1 to 300 parts by weight, preferably 1 to 200 parts by weight, per 100 parts by weight of the graft resin composition (J) or (K). When the blending amount is less than 0.1 part by weight, the final resin composition is poor in compatibility and dispersibility. Even when it is 100 parts by weight or more, the resulting thermoplastic propylene resin composition is useful as a thermoplastic elastomer, but when the blending amount exceeds 300 parts by weight, the toughness and the heat resistance are greatly deteriorated and no desirable result can be obtained.

In the thermoplastic propylene resin composition of the present invention, the filler (L) used for reinforcement, impartment of functions, extention (for reducing the manufacturing cost), etc. is blended in an amount of 0.01 to 300 parts by weight, preferably 1 to 200 parts by weight, more preferably 10 to 70 parts by weight, per 100 parts by weight of the thermoplastic resin composition comprising a polypropylene type resin (E), a polyamide resin (F), an epoxy group containing copolymer (G), and a rubber-like material (H) and/or a modified rubber-like material (I), or the thermoplastic resin composition comprising a graft resin composition (J) or (K), a polyamide resin (F) and an epoxy group containing copolymer (G). When the amount of the filler (L) is less than 0.01 part by weight, no filling effect can be obtained. When it exceeds 300 parts by weight, the toughness and the impact resistance are deteriorated and the inherent characteristics of the resins are lost, resulting in a brittle product. Thus, no desirable result can be obtained.

A method for producing the thermoplastic propylene resin composition of the present invention is not critical, and conventional methods can be used.

Although a method comprising mixing the starting materials in solution followed by evaporation of the solvent or precipitation in a non-solvent is effective, a method comprising kneading the starting materials in molten state is employed in practice from an industrial viewpoint. For the melt-kneading, there can be used conventional kneading apparatus such as Banbury mixer, extruder, roll mill, various kneaders, etc.

In the kneading, it is preferable to mix the resin components all in the form of powder or pellets uniformly and previously in an apparatus such as tumbler or Henschel mixer. If necessary, it is also possible to omit the mixing and feed predetermined amounts of the resin components to a kneading apparatus individually.

The kneaded resin composition is molded by various molding methods such as injection molding, extrusion molding, etc. The present invention includes a method in which the starting materials are dry blended during injection molding or extrusion molding without a step of previous kneading, and kneaded directly during melt processing to obtain a molded product.

In the present invention, the order of kneading is not critical, and any of the following orders may be employed. (1) The graft polypropylene (A) and/or the graft polypropylene (B), the polypropylene (C), the polyamide resin (F), the epoxy group containing copolymer (G), the rubber-like material (H) or the modified rubber-like material (I), and if necessary, the filler (L) are kneaded in one lot. (2) The graft polypropylene (A) and/or the graft polypropylene (B) and the polypropylene (C) are firstly kneaded to produce the polypropylene type resin (E), followed by kneading therewith the polyamide resin (F), the epoxy group containing copolymer (G), the rubber-like material (H) and/or the modified rubber-like material (I), and if necessary, the filler (L). (3) The polypropylene type resin (E) and the polyamide resin (F) are firstly kneaded, followed by kneading therewith the epoxy group containing copolymer (G), the rubber-like material (H) or the modified rubber-like material (I), and if necessary, the filler (L). Other kneading orders may also be employed. However, when the graft polypropylene (A) and/or the graft polypropylene (B) and the epoxy group containing copolymer (G); the epoxy group containing copolymer (G) and the modified rubber-like material (I); or the polyamide resin (F) and the epoxy group containing copolymer (G), are firstly blended, gelation occurs during the kneading in some cases, depending on the proportions of the two components of each combination. In this case, it is necessary to choose the proportions of the two components properly and knead them firstly.

Any order of kneading in the same line of the thinking as described above may be employed for the thermoplastic resin composition using the graft resin composition (J) obtained by graft copolymerization of an unsaturated carboxylic acid or a derivative thereof or the graft resin composition (K) obtained by graft copolymerization of an unsaturated carboxylic acid or a derivative thereof and an unsaturated aromatic monomer, in place of the graft polypropylene (A) and/or the graft polypropylene (B) and the modified rubber-like material (I).

In order to further simplify the kneading step, a step of previously producing the graft resin composition (J) or (K) can be incorporated into a kneading step for producing the thermoplastic propylene resin composition of the present invention.

That is, the thermoplastic propylene resin composition can be produced by subjecting the starting polypropylene and the starting rubber-like material to co-grafting in the first stage, and adding the polypropylene (C), the polyamide resin (F), the epoxy group containing copolymer (G) and if necessary, the filler (L) to the co-grafting product in molten state.

For producing the thermoplastic propylene resin composition of the present invention more effectively, it is preferable to use a high-kneading twin screw extruder having a long L/D ratio and two or more feed openings. That is, the thermoplastic propylene resin composition can be efficiently produced by feeding the starting materials for co-grafting through the first feed opening, subjecting them to co-grafting sufficiently before feeding the constituents other than the graft polypropylene (A) and/or the graft polypropylene (B) and the rubber-like material (H) through the next feed opening, and feeding the other constituents properly through the second and subsequent feed openings.

For desirable exhibition of physical properties of the thermoplastic propylene resin composition of the present invention, various kneading methods, for example, the following methods can be employed. For satisfactory exhibition of the impact resistance, there can be employed a method comprising kneading a portion of the epoxy group containing copolymer (G) with the polyamide resin (F), followed by kneading therewith the other constituents. For more effective reinforcement with the filler (L) and satisfactory exhibition of the stiffness and the heat resistance, there can be employed a method comprising kneading the filler (L) with one resin constituent which constitutes the thermoplastic propylene resin composition of the present invention and permits satisfactory dispersion therein of the filler (L), and then kneading therewith the other constituents; and a method comprising adding the filler (L) to the resin composition which has previously been melt-kneaded, in the middle of an extruder, and then kneading them.

The thermoplastic propylons resin composition of the present invention can easily be molded by usual molding methods such as injection molding, extrusion molding, compression molding, blow molding, roll molding, laminated molding, vacuum forming, pressure molding, etc. to give molded products. The present invention also includes a method in which the starting materials are dry blended during injection molding or extrusion molding without a step of previous kneading, and kneaded directly during melt processing to obtain a molded product.

Among the above molding methods, injection molding is preferred from the viewpoint of productivity and the like. Pellets of the thermoplastic propylene resin composition are firstly dried in a vacuum dryer, a hot-air dryer or the like, and then injection molded under predetermined conditions including injection speed, injection time, cooling temperature, etc., to obtain a molded product.

The following examples serve to give specific illustration of the practice of the present invention but they are not intended in any way to limit the scope of the present invention.

Methods for measuring the physical properties in the examples are described below.

(1) Specific Gravity

Measured according to the method prescribed in JIS K6758.

(2) Melt Flow Rate

Measured according to the method prescribed in JIS K6758. The measuring temperature was 280° C. and the measurement was carried out under a load of 2.16 kg unless otherwise specified.

(3) Tensile Test

Carried out according to the method prescribed in ASTM D638. The thickness of a test piece was 3.2 mm, and the tensile yield strength and the tensile elongation were evaluated. The measuring temperature was 23° C. unless otherwise specified.

(4) Flexural Test

Carried out according to the method prescribed in JIS K7203. The thickness of a test piece was 3.2 mm, and the flexural modulus and the flexural strength were evaluated under conditions of a span length of 50 mm and a loading rate of 1.5 mm/min. The measuring temperature was 23° C. unless otherwise specified. When the measurement was carried out at a temperature other than 23° C., the sample was subjected to the measurement after having been conditioned in a constant temperature bath at a predetermined temperature for 30 minutes.

(5) Izod Impact Strength

Measured according to the method prescribed in JIS K7110. The thickness of a test piece was 3.2 mm and the notched impact strength was evaluated. The measuring temperature was 23° C. unless otherwise specified. When the measurement was carried out at a temperature other than 23° C., the sample was subjected to the measurement after having been conditioned in a constant temperature bath at a predetermined temperature for 2 hours.

(6) Penetration Impact Strength

A high rate impact tester [Model RIT-8000, mfd. by Rheometrics Inc. (USA)] was used. A flat test piece of 3 mm thickness was fixed with a 2-inch circular holder and a $\frac{5}{8}$-inch (tip spherical surface: 5/16 inch R) impact probe was hit against the test piece at a speed of 3 m/sec. The degree Of deformation of the test piece and the stress were measured with the tester, and the curve shown in FIG. 1 was drawn based on the measured values. The penetration impact strength was evaluated by integrating the area along the curve.

A BRIEF DESCRIPTION OF THE DRAWING

FIG. 1 shows an example of a measurement chart evaluating the penetration impact strength. The abscissa refers to the degree of deformation of a test piece and the ordinate to the stress corresponding to individual values of the degree of deformation. Said measurement chart is obtained by measuring the degree of deformation and the stress continuously and plotting these values on an X—Y plotter continuously.

The yield point energy is determined by integrating the area with respect to the displacement and the stress from the rising of the detected stress to the point of yield of the material. The total energy is determined by integrating the area with respect to the displacement and the stress from the rising of the detected stress to the fracture of the material.

The state of fracture of the material is Judged to be ductile fracture (D) or brittle fracture (B) by observing an actual fractured test piece of the material.

An energy value required for yield of the material and an energy value required for fracture of the material were evaluated in terms of energy at the yield point and the total energy, respectively. Both of them are expressed in joule (J).

The sample was conditioned in a constant temperature bath attached to the apparatus. The test piece was placed in a constant temperature bath having previously adjusted to a predetermined temperature, conditioned for 2 hours, and then subjected to the above test. The predetermined temperature was employed as the measuring temperature.

(7) Heat Distortion Temperature

Measured according to the method prescribed in JIS K7207. The fiber stress was measured at 4.6 kg/cm$^2$.

(8) Rockwell Hardness

Measured according to the method prescribed in JIS K7207. The thickness of a test piece was 3.2 mm As a steel ball, R was used. The evaluation value is expressed on R scale.

(9) Amounts of Maleic Anhydride and Styrene Added

The amount of maleic anhydride added in the graft polypropylene (A) was determined by dissolving a small amount of each sample in hot xylene, adding anhydrous acetone to cause precipitation, re-dissolving the thus purified sample in xylene, and titrating the resulting solution with a methanolic solution of NaOH with heating (110°–120° C.) by using phenolphthalein as an indicator.

The amount of maleic anhydride added in the modified rubber-like material (G) was determined by dissolving a small amount of each sample in toluene, adding anhydrous acetone to cause precipitation, redissolving the thus purified sample in toluene, and titrating the resulting solution with a solution of KOH in ethanol with heating (85° C.) by using phenolphthalein as an indicator. The amount of styrene added in the modified rubber-like material (G) was determined from the intensity of an absorption peak due to a substituted benzene ring which appeared in an infrared absorption spectrum measured for the aforesaid purified sample.

(10) Mooney Viscosity

Measured according to the method prescribed in JIS K6300. The measuring temperature was 121° C.

(11) Number Average Molecular Weight

Measured by a gel permeation chromatography (GPC) under the following conditions:

GPC: type 150C, mfd. by Waters
Column: Shodex 80MA, mfd. by Showa Denko K.K.
Amount of sample: 300 μl (polymer concentration 0.2 wt %)
Flow rate: 1 ml/min
Temperature: 135° C.
Solvent: trichlorobenzene A calibration curve for calculating the number average molecular weight was prepared by a conventional method by using standard polystyrene mfd. by TOHSOH CORP. Data processing was conducted by means of a data processor CP-8 Model III mfd. by TOHSOH CORP.

(12) Ethylene Content

Determined by the use of a calibration curve from the absorbances of characteristic absorptions due to methyl (—CH$_3$) and methylene (—CH$_2$—) which appeared in an infrared spectrum measured by using a pressed sheet previously prepared.

(13) Falling Weight Impact Strength

Measured according to the method prescribed in JIS K7211. There was used a square test piece having a length of side of 10 cm which had been cut out of the hereinafter described molded product obtained by injection molding. The test piece was conditioned at 30° C. for 2 hours and then subjected to the measurement.

The above test pieces for determining the physical properties were prepared under the following injection molding conditions unless otherwise specified. The thermoplastic resin composition was dried in a hot-air dryer at 120° C. for 2 hours and then injection molded by means of a ISI50E type injection molding machine mfd. by Toshiba Machine Co., Ltd. at a molding temperature of 280° C. and a mold-cooling temperature of 70° C. for 15 seconds for injection and 30 seconds for cooling.

The thermoplastic resin composition described below were produced under the following conditions unless otherwise specified. Predetermined amounts of components were weighed individually, uniformly premixed in a Henschel mixer, and then kneaded in a twin screw continuous kneading machine (Model TEX 44 SS 30BW-2V, mfd. by JAPAN STEEL WORKS LTD.) with suction through a vent at an extrusion rate of 30 kg/hour, a resin temperature of 280° C. and a screw revolution rate of 350 revolutions/min. The screws were composed of two sets of a triple-thread rotor and a triple-thread kneading disc which sets were placed in two kneading zones, i.e., a zone next to the first feed opening and a zone next to the second feed opening, respectively.

EXAMPLES 1 TO 5 AND COMPARATIVE EXAMPLE 1

Table 1-1 and 1-2

A graft polypropylene (A) was produced in the following manner. A starting propylene homopolymer having a melt flow rate of 1.3 g/10 min, an intrinsic viscosity in tetralin at 135° C. of 2.45 dl/g, a 20° C. cold xylene soluble of 2.9% by weight, a boiling heptane soluble of 6.9% by weight, and an isotactic pentad of boiling heptane insoluble of 0.955 was modified as follows which had been produced by slurry polymerization by the process disclosed in JP-A-60-28405.

With 100 parts by weight of the starting propylene homopolymer were uniformly mixed in a Henschel mixer 1.0 part by weight of maleic anhydride, 0.6 part by weight of the propylene homopolymer containing as free-radical initiator 8% by weight of 1,3-bis(t-butyl-peroxyisopropyl)benzene (Sanperox ®-TY1.3, mfd. by Sanken Kako Co., Ltd.) supported thereon, and 0.1 part by weight of Irganox ® 1010 (mfd. by Ciba-Geigy Ltd.) as stabilizer. The resulting mixture was melt-kneaded with a TEX 44 SS-30BW-2V type twin screw extruder mfd. by JAPAN STEEL WORKS, LTD., at a temperature of 220° C. for an average residence time of 1.5 minutes to obtain a maleic-anhydride-grafted polypropylene (A) having an amount of maleic anhydride added of 0.08% by weight and a melt flow rate of 36 g/10 min. Said graft polypropylene (A) is hereinafter abbreviated as M-PP-1.

A Nylon 66 (Maranyl ® A125, mfd. by Unitika, Ltd.) was used as a polyamide resin (F). This starting polyamide is hereinafter abbreviated as PA-1.

An epoxy group containing copolymer (G) was produced in the following manner. A terpolymer having a weight ratio between etylene, vinyl acetate and glycidyl methacrylate of 85:5:10 (wt %) and a melt flow rate of 7 g/10 min (190° C., load 2.16 kg) was produced by high-pressure radical polymerization according to the process disclosed in JP-A-47-23490 and JP-A-48-11888. This epoxy group containing copolymer is hereinafter abbreviated as E. VA. GMA.-1.

A modified rubber-like material (I) was produced in the following manner.

With 100 parts by weight of pellets of ethylene-propylene copolymer rubber having a number average molecular weight of 60,000 and an ethylene content of 78% by weight were mixed in a Henschel mixer 2.0 parts by weight of maleic anhydride and 1.0 part by weight of the propylene homopolymer containing as free-radical initiator 8% by weight of 1,3-bis(t-butyl-peroxyisopropyl)benzene (Sanperox ®-TY1.3, mfd. by Sanken Kako Co., Ltd.) supported thereon. Subsequently, the resulting mixture was melt-kneaded under nitrogen by means of a TEX 44 SS-30BW-2V type twin screw extruder mfd. by JAPAN STEEL, WORKS LTD., at a kneading temperature of 250° C. and an extrusion rate of 18 kg/hour to obtain a modified ethylene-propylene copolymer rubber having an amount of maleic anhydride added of 0.7% by weight and a Mooney viscosity (ML$_{1+4}$, 121° C.) of 72. Said modified ethylene-propylene copolymer rubber is hereinafter abbreviated as M-EPM-1.

The above starting materials were blended. As shown in Table 1-1, the blending proportions of M-EPM-1 and E.VA.GMA-1 were unvaried, while those of M-PP-1 and PA-1 were various. Each blend was kneaded under the predetermined conditions to obtain a thermoplastic resin composition. Test pieces were made of the thermoplastic resin composition under the predetermined injection molding conditions and subjected to evaluation of the physical properties by the predetermined methods. The blending proportions are expressed in % by weight. The results of evaluation of the physical properties are shown in Table 1-2.

Although Izod impact strength is generally employed for impact resistance evaluation, penetration impact strength is often high even when Izod impact strength is low. Nylon 66's have a much higher penetration impact strength than do propylene-ethylene-propylene block copolymers though they have a lower notched Izod impact strength at −30° C. than do the latter. Low-temperature falling ball test is employed for actual service evaluation of automobile parts, and the actual service evaluation by this test gives results which are well consistent with those obtained by a laboratory evaluation of the penetration impact strength.

In evaluation of the penetration impact strength, the higher the energy at yield point and the total energy, the higher the rating. The energy at yield point and the total energy can be calculated from the measurement chart. In addition, the state of fracture of a test piece at fracture point is important for associating the evaluation of the penetration impact strength with the actual service evaluation.

The state of fracture cannot be determined from the measurement chart and is Judged by observing the state of fracture of a test piece after breakage. A state of fracture in which a sharp crack is formed or the test piece is divided into several pieces is referred to as "brittle fracture". A state of fracture in which the test piece is fractured in accordance with the shape of an impact probe without formation of a sharp crack or division into several pieces is referred to as "ductile fracture". The ductile fracture is preferable to the brittle fracture.

It can be seen that in Examples 1 to 5 of the present invention, the Izod impact strength and the penetration impact strength were greatly improved as compared with Comparative Example 1 in which no modified ethylene-propylene copolymer rubber was blended.

EXAMPLES 6 TO 8

Tables 2-1 and 2-2

The same starting materials as used in Examples 1 to 5 were blended. As shown in Table 2-1, the blending proportions of PA-1 and E.VA.GMA-1 were unvaried, while those of M-PP-1 and M-EPM-1 were various. Using the blends thus obtained, thermoplastic resin compositions were produced in the same manner as in Examples 1 to 5, and their physical properties were evaluated. The results of the evaluation are shown in Table 2-2.

The higher the blending proportion of the modified ethylene-propylene copolymer rubber M-EPM-1, the higher the Izod impact strength and the penetration impact strength. By contrast, the higher said blending proportion, the lower the heat distortion temperature and hence the heat resistance.

EXAMPLES 9 AND 10 AND COMPARATIVE EXAMPLE 2

Tables 3-1 and 3-2

The same starting materials as used in Examples 1 to 5 were blended. As shown in Table 3-1, the blending proportions of M-PP-1 and PA-1 were unvaried, while those of M-EPM-1 and E.VA.GMA-1 were various. Using the blends thus obtained, thermoplastic resin compositions were produced in the same manner as in Examples 1 to 5, and their physical properties were evaluated. The evaluation results are shown in Table 3-2. It can be seen that in Examples 9 and 10 of the present invention, the Izod impact strength and the penetration impact strength were markedly improved as compared with Comparative Example 2 in which the epoxy group containing copolymer E.VA.GMA-1 was not blended.

EXAMPLE 11

Tables 4-1 and 4-2

A graft polypropylene (A) was produced in the following manner. By the same method as that used for producing M-PP-1 in Examples 1 to 5, grafting was conducted on a starting highly crystalline propylene homopolymer having an intrinsic viscosity in tetraline at 135° C. of 2.42 dl/g, a melt flow rate of 1.6 g/10 min, a 20° C. cold xylene soluble of 0.6% by weight, a boiling heptane soluble of 2.9% by weight and an isotactic pentad of boiling heptane insoluble of 0.980 which had been produced by the slurry polymerization process disclosed in JP-A-60-228504. Thus, there was obtained a maleic-anhydride-grafted highly crystalline polypropylene having an amount of maleic anhydride added of 0.08% by weight and a melt flow rate of 36 g/10 min.

This graft highly crystalline polypropylene is hereinafter abbreviated as M-PP-2.

The same starting materials as in Examples 1 to 5 were blended in the proportions shown in Table 4-1, except that M-PP-2 was used as graft polypropylene. Using the resulting blend, a thermoplastic resin composition was produced in the same manner as in Examples 1 to 5, and its physical properties were evaluated. The evaluation results are shown in Table 4-2.

Although satisfactory physical properties were attained in Example 2 of the present invention in which the usual graft polypropylene M-PP-1 was used, it can be seen that the employment of the graft highly crystalline polypropylene M-PP-2 results in an increase of the flexural modulus and a rise of the heat distortion temperature and hence brings about desirable effects on the stiffness and the heat resistance.

EXAMPLE 12

Tables 5-1 and 5-2

A modified rubber-like material (I) was produced in the following manner. Ground product of an ethylene-propylene copolymer rubber having a number average molecular weight of 55,000 and an ethylene content of 47% by weight was modified by the same method as used for producing M-EPM-1 in Examples 1 to 5, to obtain a modified ethylene-propylene copolymer rubber having an amount of maleic anhydride added of 0.5% by weight and a Mooney viscosity ($ML_{1+4}$, 121° C.) of 65.

This modified ethylene-propylene copolymer rubber is hereinafter abbreviated as M-EPM-2.

The same starting materials as in Example 11 were blended in the proportions shown in Table 5-1, except that M-EPM-2 was used as modified ethylene-propylene copolymer rubber. Using the resulting blend, a thermoplastic resin composition was produced in the same manner as in Examples 1 to 5, and its physical properties were evaluated. The evaluation results are shown in Table 5-2.

Although satisfactory physical properties were obtained in Example 11 of the present invention in which M-EPM-1 was used as modified ethylene-propylene copolymer rubber, employment of M-EPM-2 brought about desirable effects on the low-temperature Izod impact strength and the low-temperature penetration impact strength.

EXAMPLE 13

Tables 6-1 and 6-2

An epoxy group containing copolymer (G) was produced in the following manner. In the same manner as in Examples 1 to 5, except that methyl acrylate was used as comonomer in place of vinyl acetate, there wss produced by high-pressure radical polymerization a terpolymer having a high glycidyl methacrylate content, a weight ratio between ethylene, methyl acrylate and glycidyl methacrylate of 64:14:22 (wt %), and a melt flow rate of 21 g/10 min (190° C., load 2.16 kg). Said epoxy group containing copolymer was hereinafter abbreviated as E.MA.GMA-1.

The same starting materials as in Example 12 were blended in the proportions shown in Table 6-1, except that E.MA.GMA-1 was used as epoxy group containing copolymer. Using the resulting blend, a thermoplastic resin composition was produced in the same manner as in Examples 1 to 5, and its physical properties were evaluated. The evaluation results are shown in Table 6-2.

The physical properties were satisfactory as in Example 12.

EXAMPLE 14

Tables 7-1 and 7-2

Besides using the starting propylene homopolymer for M-PP-1 (hereinafter abbreviated as PP-1) as polypropylene (C), the same materials as in Examples 1 to 5 were used. They were blended in the proportions shown in Table 7-1. using the blend, a thermoplastic resin composition was produced in the same manner as in Examples 1 to 5, and its physical properties were evaluated.

The evaluation results are shown in Table 7-2. It can be seen that in Example 14 of the present invention, the Izod impact strength and the penetration impact strength were greatly improved as compared with Comparative Example 1 in which the modified ethylene-propylene copolymer rubber M-EPM-1 was not blended.

EXAMPLE 15

Tables 8-1 and 8-2

A thermoplastic resin composition was produced in the same manner as in Example 13, except that a graft resin composition (J) was used in place of M-PP-2 and and M-EPM-2. In a Henschel mixer, 100 parts by weight of a blend of powder of the starting polypropylene for M-PP-2 and pellets of the starting ethylene-propylene copolymer rubber for M-EPM-2 in the ratio of 55:23 was uniformly mixed with 1.5 parts by weight of maleic anhydride, 0.6 part by weight of the propylene homopolymer containing as free-radical initiator 8% by weight of 1,3-bis (t-butylperoxyisopropyl) benzene (Sanperox ®-TY1.3, mfd. by Sanken Kako Co., Ltd.) supported thereon, and 0.1 part by weight of Irganox ® 1010 (mfd. by Ciba Geigy Ltd.) as stabilizer. The resulting mixture was melt-kneaded by means of a TEX 44 SS-30-BW-2V type twin screw extruder mfd. by JAPAN STEEL WORKS, LTD., at a temperature of 220° C. for an average residence time of 1.5 minutes to obtain a maleic-anhydride-co-grafted polypropylene/ethylene-propylene copolymer rubber having an amount of maleic anhydride added of 0.20% by weight and a melt flow rate of 15 g/10 min. This co-grafting product is hereinafter abbreviated as M-(PP-2/EPM-2).

A thermoplastic resin composition was produced in the same manner as in Example 13, except that the co-grafting product M-(PP-2/EPM-2) was used as shown in Table 8-1. Its physical properties were evaluated. The evaluation results are shown in Table 8-2.

Also when the co-grafting product M-(PP-2/EPM-2) was used, the Izod impact strength and the penetration impact strength were satisfactory as in Example 13 in which the modified products M-PP-2 and M-EPM-2 obtained by the individual modifications were used.

EXAMPLES 16 TO 20

Tables 9-1 and 9-2

A modified rubber-like material (I) was produced in the following manner. With 100 parts by weight of pellets of ethylene-propylene copolymer rubber having a number average molecular weight of 60,000 and an ethylene content of 78% by weight were mixed in a Henschel mixer 2.0 parts by weight of maleic anhydride, 2.0 parts by weight of styrene and 1.0 part by weight of the propylene homopolymer containing as free-radical initiator 8% by weight of 1,3-bis(t-butylperoxyisopropyl)benzene (Sanperox ®-TY1.3, mfd. by Sanken Kako Co., Ltd.) supported thereon. Subsequently, the resulting mixture was melt-kneaded under nitrogen by means of a TEX 44 SS-30BW-2V type twin screw extruder mfd. by JAPAN STEEL WORKS, LTD., at a kneading temperature of 250° C. and an extrusion rate of 18 kg/hour to obtain a modified ethylene-propylene copolymer rubber having an amount of maleic anhydride added of 1.5% by weight, an amount of styrene added of 0.8% by weight and a Mooney viscosity ($ML_{1+4}$, 121° C.) of 70. Said modified ethylene-propylene copolymer rubber is hereinafter abbreviated as MS-EPM-1.

The above materials were blended. As shown in Table 9-1, the blending proportions of MS-EPM-1 and E.VA.GMA-1 were unvaried, while those of M-PP-1 and PA-1 were various. Each blend was kneaded under the predetermined conditions to obtain a thermoplastic resin composition. Test pieces were made of the thermoplastic resin composition under the predetermined injection molding conditions and subjected to evaluation of the physical properties by the predetermined methods. The evaluation results are shown in Table 9-2.

It can be seen that in Examples 16 to 20, the Izod impact strength and the penetration impact strength were greatly improved as compared with Comparative Example 1 in which no modified ethylene-propylene copolymer rubber was blended.

EXAMPLE 21

Tables 10-1 and 10-2

A modified rubber-like material (I) was produced in the following manner. With 100 parts by weight of a styrene-ethylene.butylene-styrene block copolymer rubber (KRATON ®-G 1657, mfd. by Shell Chemical Co.) having a number average molecular weight of 50,000, a number average molecular weight of styrene block of 5,000, a number average molecular weight of ethylene.butylene block of 35,000 and a weight ratio of styrene block to ethylene.butylene block of 30:70 were mixed in a Henschel mixer 2.0 parts by weight of maleic anhydride, 2.0 parts by weight of styrene and 1.0 part by weight of the propylene homopolymer containing as free-radical initiator 8% by weight of 1,3-bis (t-butylperoxyisopropyl)benzene (Sanperox ®-TY1.3, mfd. by Sanken Kako Co., Ltd.) supported thereon. Subsequently, the resulting mixture was melt-kneaded under nitrogen by means of a ZSK-120 type twin screw extruder mfd. by Werner & Pfleiderer, Inc., at a kneading temperature of 250° C. and an extrusion rate of 230 kg/hour to obtain a modified styrene-ethylene.butylene-styrene block copolymer rubber having an amount of maleic anhydride added of 0.59% by weight.

Said modified styrene-ethylene.butylene-styrene block copolymer rubber is hereinafter abbreviated as MS-SEBS-1.

The same materials as in Examples 1 to 5 were blended in the proportions shown in Table 10-1, except that the modified styrene-ethylene.butylene-styrene block copolymer rubber MS-SEBS-1 was used in place of the modified ethylene-propylene copolymer rubber. Using the resulting blend, a thermoplastic resin composition was produced in the same manner as in Examples 1 to 5, and its physical properties were evaluated. The evaluation results are shown in Table 10-2.

The physical properties were satisfactory as in Examples 1 to 5.

EXAMPLE 22

Tables 11-1 and 11-2

A nylon 6,6 reinforced with glass long fiber, "VERTON" RF700-10 mfd. by Unitika, Ltd. was used as filler (L). This nylon 6,6 reinforced with glass long fiber is hereinafter abbreviated as PA.GF-1. The ratio of glass fiber to nylon 6,6 in PA.GF-1 is 50:50.

Besides using PA.GF-1 as a filler, the same materials as in Examples 16 to 20 were used. They were blended in the proportions shown in Table 11-1, as follows. The components other than PA.GF-1 were fed through the first feed opening and previously melt-kneaded, after which PA.GF-1 was fed through the second feed opening. The resulting blend was kneaded under the predetermined conditions to obtain a thermoplastic resin composition, and evaluation of the physical properties was done in the same manner as in Examples 16 to 20.

The evaluation results are shown in Table 11-2.

In Example 22, the flexural modulus and the heat distortion temperature were much higher as compared with Example 17 in which PA.GF-1 was not blended as a filler.

EXAMPLE 23

Tables 12-1 and 12-2

The same materials as in Examples 1 to 5 were blended in the proportions shown in Table 12-1, except that a nylon 6 (Grilon® W5744, mfd. by EMS-CHEMIE AG: hereinafter abbreviated as PA-2) was used as polyamide resin (F). The resulting blend was kneaded under the predetermined conditions to obtain a thermoplastic resin composition. Test pieces were made of the thermoplastic resin composition under the predetermined injection molding conditions and subjected to evaluation of the physical properties by the predetermined methods. The melt flow-rate was measured at a temperature of 230° C. The evaluation results are shown in Table 12-2.

In Example 23, as in Examples 1 to 5, the Izod impact strength and the penetration impact strength were markedly improved as compared with Comparative Example 1.

EXAMPLE 24

Tables 12-1 and 12-2

The same materials as in Example 23 were blended in the proportions shown in Table 12-1, except that an ethylene-propylene copolymer rubber having a number average molecular weight of 60,000 and an ethylene content of 78% by weight was used as rubber-like material (H) instead of using the modified rubber-like material (I). The resulting blend was kneaded under the predetermined conditions to obtain a thermoplastic resin composition. Test pieces were made of the thermoplastic resin composition under the predetermined injection molding conditions and subjected to evaluation of the physical properties by the predetermined methods. The evaluation results are shown in Table 12-2.

In Example 24, as in Examples 23, the Izod impact strength and the penetration impact strength were greatly improved as compared with Comparative Example 1.

EXAMPLE 25

Tables 13-1 and 13-2

The same materials as in Examples 1 to 5 were blended in the proportions shown in Table 13-1, except that a nylon 6 (Nylon A1025, mfd. by Unitika, Ltd.: hereinafter abbreviated as PA-3) was used as polyamide resin (F). Using the resulting blend, a thermoplastic resin composition was produced in the same manner as in Examples 1 to 5, and its physical properties were evaluated. The evaluation results are shown in Table 13-2. It can be seen that said thermoplastic resin composition had a high hardness, was flexible, had a greatly improved impact strength, and gave desirable results as a soft elastomer.

EXAMPLE 26

Tables 14-1 and 14-2

The same materials as in Example 21 were blended in the proportions shown in Table 14-1, except that a nylon 6 (Nylon A1025, mfd. by Unitika, Ltd.: hereinafter abbreviated as PA-3) was used as polyamide resin (F). Using the resulting blend, a thermoplastic resin composition was produced in the same manner as in Example 21, and its physical properties were evaluated. The evaluation results are shown in Table 14-2. It can be seen that said thermoplastic resin composition was flexible, had a markedly improved impact strength, and gave desirable results as a soft elastomer.

EXAMPLE 27

Tables 15-1 and 15-2

The same materials as in Example 22 were used except that micronized talc Microace® p132 mfd. by Nihon Talc, Ltd. was used as filler (L) in place of PA.GF-1. Said micronized talc is hereinafter abbreviated as TALC-1.

The 50% average particle size D50 of Microace® P132 was 2.1 $\mu$ as measured by the following method:

Measuring apparatus: Centrifugal sedimentation type particle size measuring apparatus Model SA-CP2-20, mfd. by Shimadzu Corp.

Revolution rate: 500 r.p.m.

Liquid level: 3

D50 was determined through cumulative distribution curve.

The blending proportions of the materials were as shown in Table 15-1. In the first stage, PA-1 and TALC-1 were previously melt-kneaded in the ratio of 50:10 under the predetermined conditions and pelletized. In the second stage, the pellets thus obtained were blended with the other components and the resulting blend was kneaded under the predetermined conditions to obtain a thermoplastic resin composition. Evaluation of the physical properties was done in the same manner as in Examples 16 to 20.

The evaluation results are shown in Table 15-2.

In Example 27, the flexural modulus and the heat distortion temperature were much higher as compared with Example 20 in which TALC-1 was not blended as a filler.

EXAMPLES 28 TO 32 AND COMPARATIVE EXAMPLE 3

Tables 16-1 and 16-2

A graft polypropylene (B) was produced in the following manner. A starting propylene homopolymer having a melt flow rate of 1.3 g/10 min, an intrinsic viscosity in tetralin at 135° C. of 2.45 dl/g, a 20° C. cold xylene soluble of 2.9% by weight, a boiling heptane soluble of 6.7% by weight, and an isotactic pentad of boiling heptane insoluble 0.955 was modified as follows which had been produced by slurry polymerization by the process disclosed in JP-A-60-28405.

With 100 parts by weight of the starting propylene homopolymer were uniformly mixed in a Henschel mixer 1.0 part by weight of maleic anhydride, 0.5 part by weight of styrene, 0.6 part by weight of the propylene homopolymer containing as free-radical initiator 8% by weight of 1,3-bis (t-butylperoxyisopropyl)benzene (Sanperox®-TY1.3, mfd. by Sanken Kako Co., Ltd.) supported thereon, and 0.1 part by weight of Irganox® 1010 (mfd. by Ciba-Geigy Ltd.) as stabilizer. The resulting mixture was melt-kneaded by means of a TEX 44 SS-30BW-2V type twin screw extruder mfd. by JAPAN STEEL WORKS, LTD., at a temperature of 220° C. for an average residence time of 1.5 minutes to obtain a (maleic anhydride-styrene)-grafted polypropylene (B) having an amount of maleic anhydride added of 0.15% by weight, an amount of styrene added of 0.07% by weight and a melt flow rate of 21 g/10 min. Said graft polypropylene (B) is hereinafter abbreviated as MS-PP-1.

The same materials as in Examples 16 to 20 were blended in the same proportions as in Examples 16 to 20, except that the graft polypropylene MS-PP-1 was used in place of the graft polypropylene (A). Using the blends thus obtained, thermoplastic resin composition were produced in the same manner as in Examples 16 to 20, and their physical properties were evaluated.

The evaluation results are shown in Table 16-2.

It can be seen that in Examples 28 to 32 of the present invention, the Izod impact strength and the penetration impact strength were greatly improved as compared with Comparative Example 3 in which no modified ethylene-propylene copolymer rubber was blended.

EXAMPLES 33 TO 35

Tables 17-1 and 17-2

The same materials as used in Examples 28 to 32 were blended. As shown in Table 17-1, the blending proportions of PA-1 and E.VA.GMA-1 were unvaried, while those of MS-PP-1 and MS-EPM-1 were various. Using the blends thus obtained, theremoplastic compositions were produced in the same manner as in Examples 28 to 32, and their physical properties were evaluated. The evaluation results are shown in Table 17-2.

The higher the blending proportion of the modified ethylene-propylene copolymer rubber MS-EPM-1, the higher the Izod impact strength and the penetration impact strength. By contrast, the higher said blending proportion, the lower the heat distortion temperature and hence the heat resistance.

EXAMPLES 36 AND 37 AND COMPARATIVE EXAMPLE 4

Tables 18-1 and 18-2

The same materials as used in Examples 28 to 32 were blended. As shown in Table 18-1, the blending proportions of MS-PP-1 and PA-1 were unvaried, while those of MS-EPM-1 and E.VA.GMA-1 were various. Using the blends thus obtained, thermoplastic resin compositions were produced in the same manner as in Examples 28 to 32, and their physical properties were evaluated. The evaluation results are shown in Table 18-2. It can be seen that in Examples 36 and 37 of the present invention, the Izod impact strength and the penetration impact strength were markedly improved as compared with Comparative Example 4 in which the epoxy group containing copolymer E.VA.GMA-1 was not blended.

EXAMPLE 38

Tables 19-1 and 19-2

A graft polypropylene (B) was produced in the following manner. By the same method as that used for producing MS-PP-1 in Examples 28 to 32, grafting was conducted on a starting highly crystalline propylene homopolymer having an intrinsic viscosity in tetralin at 135° C. of 2.42 dl/g, a melt flow rate of 1.6 g/10 min, a 20° C. cold xylene soluble of 0.6% by weight, a boiling heptane soluble of 2.9% by weight and an isotactic pentad of boiling heptane insoluble of 0.980 which had been produced by the slurry polymerization process disclosed in JP-A-60-228504. Thus, there was obtained a (maleic anhydride-styrene)-grafted highly crystalline polypropylene having an amount of maleic anhydride added of 0.15.% by weight, an amount of styrene added of 0.07% by weight, and a melt flow rate of 21 g/10 min. This graft highly crystalline polypropylene is hereinafter abbreviated as MS-PP-2.

The same materials as in Examples 28 to 32 were blended in the proportions shown in Table 19-1, except that MS-PP-2 was used as graft polypropylene. Using the resulting blend, a thermoplastic resin composition was produced in the same manner as in Examples 28 to 32, and its physical properties were evaluated. The evaluation results are shown in Table 19-2.

Although satisfactory physical properties were attained in Example 29 of the present invention in which the usual graft polypropylene MS-PP-1 was used, it can be seen that the employment of the graft highly crystalline polypropylene MS-PP-2 results in an increase of the flexural modulus and a rise of the heat distortion temperature and hence brings about desirable effects on the stiffness and the heat resistance.

EXAMPL 39

Tables 20-1 and 20-2

A modified rubber-like material (I) was produced in the following manner. Ground product of an ethylene-propylene copolymer rubber having a number average molecular weight of 55,000 and an ethylene content of 47% by weight was modified by the same method as that used for producing MS-EPM-1 in Examples 28 to 32, to obtain a modified ethylene-propylene copolymer rubber having an amount of maleic anhydride added of 1.2% by weight, an amount of styrene added of 0.7% by weight and a Mooney viscosity ($ML_{1+4}$, 121° C.) of 40.

This modified ethylene-propylene copolymer rubber is hereinafter abbreviated as MS-EPM-2.

The same materials as in Example 38 were blended in the proportions shown in Table 20-1, except that MS-EPM-2 was used as modified ethylene-propylene copolymer rubber. Using the resulting blend, a thermoplastic resin composition was produced in the same manner as in Examples 28 to 32, and its physical properties were evaluated. The evaluation results are shown in Table 20-2.

Although satisfactory physical properties were attained in Example 38 of the present invention in which MS-EPM-1 was used as modified ethylene-propylene copolymer rubber, employment of MS-EPM-2 brought about desirable effects on the low-temperature Izod impact strength and the low-temperature penetration impact strength.

EXAMPLE 40

Tables 21-1 and 21-2

The same materials as in Example 39 were blended in the proportions shown in Table 21-1, except for using E.MA.GMA-1, i.e., the same epoxy group containing copolymer (G) as used in Example 13. Using the resulting blend, a thermoplastic resin composition was produced in the same manner as in Examples 28 to 32, and its physical properties were evaluated. The evaluation results are shown in Table 21-2.

The physical properties were satisfactory as in Example 39.

EXAMPLE 41

Tables 22-1 and 22-2

The same materials as in Examples 28 to 32 were blended in the proportions shown in Table 22-1, except that the starting propylene homopolymer for MS-PP-2 (hereinafter abbreviated as PP-2) was used as polypropylene (C). Using the resulting blend, a thermoplastic resin composition was produced in the same manner as in Examples 28 to 32, and its physical properties were evaluated.

The evaluation results are shown in Table 22-2. It can be seen that in Example 41 of the present invention, the Izod impact strength and the penetration impact strength were greatly improved as compared with Comparative Example 3 in which the modified ethylene-propylene copolymer rubber MS-FPM-1 was not blended.

EXAMPLE 42

Tables 23-1 and 23-2

The same materials as in Examples 28 to 32 were blended in the proportions shown in Table 23-1, except that M-PP-1 and MS-PP-1 were used as graft polypropylenes. Using the resulting blend, a thermoplastic resin composition was produced in the same manner as in Examples 28 to 32, and its physical properties were evaluated.

The evaluation results are shown in Table 23-2.

It can be seen that in Example 42 of the present invention, the Izod impact strength and the penetration impact strength were markedly improved as compared with Comparative Example 3 in which the modified ethylene-propylene copolymer rubber MS-EPM-1 was not blended.

EXAMPLE 43

Tables 24-1 and 24-2

A thermoplastic resin composition was produced in the same manner as in Example 40, except that in place of MS-PP-2 and MS-EPM-2, a co-grafting product of the starting polypropylene for MS-PP-2 and the starting ethylene-propylene copolymer rubber for MS-EPM-2 was used. In a Hensachel mixer, 100 parts by weight of a blend of powder of the starting polypropylene for MS-PP-2 and pellets of the starting ethylene-propylene copolymer rubber for MS-EPM-2 in the ratio of 55:23 was uniformly mixed with 1.5 parts by weight of maleic anhydride, 0.5 part by weight of styrene, 0.6 part by weight of the propylene homopolymer containing as free-radical initiator 8% by weight of 1,3-bis(t-butylperoxyisopropyl)benzene (Sanperox®-TY1.3, mfd. by Sanken Kako Co., Ltd.) supported thereon, and 0.1 part by weight of Irganox® 1010 (mfd. by Ciba-Geigy Ltd.) as stabilizer. The resulting mixture was melt-kneaded by means of a TEX 44 SS-30BW-2V type twin screw extruder mfd. by JAPAN STEEL WORKS, LTD., at a temperature of 220° C. for an average residence time of 1.5 minutes to obtain a (maleic anhydride-styrene)-co-grafted polypropylene/ethylene-propylene copolymer rubber having an amount of maleic anhydride added of 0.24% by weight, an amount of styrene added of 0.23% by weight and a melt flow rate of 15 g/10 min. This co-grafting product is hereinafter abbreviated as MS-(PP-2/EPM-2).

A thermoplastic resin composition was produced in the same manner as in Example 40, except that the co-grafting product MS-(PP-2/EPM-2) was used as shown in Table 24-1. Its physical properties were evaluated. The evaluation results are shown in Table 24-2.

Also when the co-grafting product MS-(PP-2/EPM-2) was used, the Izod impact strength and the penetration impact strength were satisfactory as in Example 40 in which the modified products MS-PP-2 and MS-EPM-2 obtained by the individual modifications were used.

EXAMPLE 44

Tables 25-1 and 25-2

The same materials as in Example 40 were blended in the proportions shown in Table 25-1, except that the modified styrene-ethylene.butylene-styrene block copolymer rubber MS-SEBS-1 was used in place of the modified ethylene-propylene copolymer rubber. Using the resulting blend, a thermoplastic resin composition was produced in the same manner as in Example 40, and its physical properties were evaluated. The evaluation results are shown in Table 25-2. The physical properties were satisfactory as in Example 40.

EXAMPLE 45

Tables 26-1 and 26-2

A nylon 6,6 reinforced with glass long fiber, "VERTON" RF-700-10, mfd. by Unitika, Ltd. was used as filler (I). This nylon 6,6 reinforced with glass long fiber is hereinafter abbreviated as PA.GF-1. The ratio of glass fiber to nylon 6,6 in PA.GF-1 was 50:50.

The same materials as in Example 38 were blended in the proportions shown in Table 25-1, except that PA.GF-1 was used as a filler. The components other than PA.GF-1 were fed through the first feed opening and previously melt-kneaded, and the PA.GF-1 was fed through the second feed opening. The resulting blend was kneaded under the predetermined conditions to obtain a thermoplastic resin composition. Evaluation of the physical properties was done in the same manner as in the Examples.

The evaluation results are shown in Table 25-2.

In Example 45, the flexural modulus and the heat distortion temperature were much higher as compared with Example 38 in which PA.GF-1 was not blended as a filler.

EXAMPLE 46

Tables 27-1 and 27-2

The same materials as in Examples 28 to 32 were blended in the proportions shown in Table 26-1, except that PA-2 was used as polyamide resin (F). The resulting blend was kneaded under the predetermined conditions to obtain a thermoplastic resin composition. Evaluation of the physical properties was done by the predetermined methods. The melt flow rate was measured at a temperature of 230° C. The evaluation results are shown in Table 27-2.

In Example 46, as in Examples 28 to 32, the Izod impact strength and the penetration impact strength were greatly improved as compared with Comparative Example 3.

EXAMPLE 47

Tables 28-1 and 28-2

The same materials as in Example 29 were blended in the proportions shown in Table 28-1, except that an ethylene-propylene copolymer rubber having a number average molecular weight of 60,000 and an ethylene content of 78% by weight was used as rubber-like material (H) instead of using the modified rubber-like material (I). The resulting blend was kneaded under the predetermined conditions to obtain a thermoplastic resin composition. Test pieces were made of the thermoplastic resin composition under the predetermined injection molding conditions and subjected to evaluation of the physical properties by the predetermined methods. The evaluation results are shown in Table 28-2.

In Example 47, as in Examples 28 to 32, the Izod impact strength and the penetration impact strength were greatly improved as compared with Comparative Example 3.

EXAMPLE 48

Tables 29-1 and 29-2

The same materials as in Examples 28 to 32 were blended in the proportions shown in Table 29-1, except that PA-3 was used as polyamide resin (G). Using the resulting blend, a thermoplastic resin composition was produced in the same manner as in Examples 28 to 32, and its physical properties were evaluated. The evaluation results are shown in Table 29-2. It can be seen that said thermoplastic resin composition had a high hardness, was flexible, had a markedly improved impact strength, and gave desirable results as a soft elastomer.

EXAMPLE 49

Tables 30-1 and 30-2

The same materials as in Example 44 were blended in the proportions shown in Table 30-1, except that PA-3 was used as polyamide resin (G). Using the resulting blend, a thermoplastic resin composition was produced in the same manner as in Example 43, and its physical properties were evaluated. The evaluation results are shown in Table 30-2. It can be seen that said thermoplastic resin composition had a high hardness, was flexible, had a markedly improved impact strength, and gave desirable results as a soft elastomer.

EXAMPLE 50

The micronized talc TALC-1 was used as filler (1) in place of PA.GF-1.

The blending proportions of materials were as shown in Table 31-1. In the first stage, PA-1 and TALC-1 were melt-kneaded in the ratio of 50:10 under the predetermined conditions and pelletized. In the second stage, the pellets thus obtained were blended with the other components. The resulting blend was kneaded under the predetermined conditions to obtain a thermoplastic resin composition. Evaluation of the physical properties was done in the same manner as in Examples 28 to 32.

The evaluation results are shown in Table 31-2.

In Example 50, the flexural modulus and the heat distortion temperature were much higher as compared with Example 28 in which TALC-1 was not blended as a filler.

The thermoplastic resin composition of the present invention is not only good in molding processability but also markedly effective in that it can give molded products much superior in physical properties to those obtained from individual polymers constituting the thermoplastic resin composition.

The novel thermoplastic resin composition provided by the present invention can easily be processed into a molded product, a film, a sheet or the like by a molding method usually used for molding thermoplastic resins, for example, injection molding, extrusion molding or the like, giving a product which has a very good balance among stiffness, heat resistance, impact resistance, scratch resistance, coating properties, oil resistance, chemical resistance, water resistance, etc., and is excellent in appearance uniforming and smoothness. It can be advantageously used for a purpose in which especially high heat resistance and impact resistance, in particular, low-temperature impact resistance, are required.

EXAMPLE 51

Tables 32-1 and 32-2

The same procedure as in Example 43 was repeated except that the pellets of the starting ethylene-propylene copolymer rubber was replaced by pellets of ethylene-butene-1 copolymer rubber having a number average molecular weight of 50,000 and an amount of ethylene added of 82% by weight to carry out the co-modification. Thus, a (maleic anhydride-styrene)-co-grafted popypropylene/ethylene-butene-1 copolymer rubber having an amount of maleic anhydride added of 0.25% by weight, an amount of styrene added of 0.24% by weight and a melt flow rate of 17 g/10 min was obtained. This co-grafting product is hereinafter abbreviated as MS-(PP-2/EBM-1).

The product in Example 51 wherein the ethylene-butene-1 copolymer rubber was used showed a higher Rockwell hardness and a more advantageous scratch resistance than the product in Example 43 wherein the ethylene-propylene copolymer rubber was used.

EXAMPLE 52

Tables 33-1 and 33-2

A highly crystalline propylene block copolymer (hereinafter abbreviated as PP-3) prepared according to the slurry polymerization process disclosed in JP-A-60-228504 was used as a starting polypropylene (C). The copolymer had the following properties:

Melt flow rate: 7.5 g/10 min,

Intrinsic viscosity in tetralin at 135° C.: 2.18 dl/g,

Content of polypropylene homopolymer portion, the first segment produced in the first polymerization step (hereinafter referred to as the P portion): 84% by weight, Content of ethylene-propylene copolymer portion, the second segment produced in the second polymerization step (hereinafter referred to as the EP portion): 16% by weight, Intrinsic viscosity of the P portion in tetralin at 135° C.: 1.60 dl/g, 20° C. Cold xylene soluble of the P portion: 1.6% by weight, Boiling heptane soluble of the P portion: 4.6% by weight, Isotactic pentad of the boiling heptane insoluble of the P portion: 0.975, Intrinsic viscosity of the EP portion in tetralin at 135° C.: 5.2 dl/g, and Weight ratio of ethylene/propylene in the EP portion: 37/63.

As the polypropylene, a starting highly crystalline propylene block copolymer (hereinafter referred to as PP-4) was prepared according to the slurry polymerization process disclosed in JP-A-60-228504 and used. The block copolymer had the following properties:

Melt flow rate: 3.0 g/10 min,

Intrinsic viscosity in tetralin at 135° C.: 2.18 dl/g,

Content of polypropylene homopolymer portion, the first segment produced in the first polymerization step (hereinafter referred to as the P portion): 74% by weight, Content of ethylene-propylene copolymer portion, the second segment produced in the second polymerization step (hereinafter referred to as the EP portion: 26% by weight, Intrinsic viscosity of the P portion in tetralin at 135° C.: 1.64 dl/g, 20° C. Cold xylene soluble of the P portion: 1.6% by weight, Boiling heptane soluble of the P portion: 4.6% by weight, Isotactic pentad of the boiling heptane insoluble of the P portion: 0.975, Intrinsic viscosity of the EP portion in tetralin at 135° C.: 7.58 dl/g, and Weight ratio of ethylene/propylene in the EP portion: 48/52.

A graft resin composition (K) was produced in the same manner as in Example 43, except that a blend of powder of PP-4 and pellets of EPM-1 in the ratio of 34:14 was used as the starting materials. A (maleic anhydride-styrene)-co-grafted polypropylene/ethylene-propylene copolymer rubber having an amount of maleic anhydride added of 0.53% by weight, an amount of styrene added of 0.30% by weight and a melt flow rate of 3.6 g/10 min. was obtained. This co-grafting product is hereinafter abbreviated as MS-(PP-4/EPM-1).

A composition was obtained by mixing in the same manner as in Examples 1-5 in a mixing ratio shown in Table 33-1 using MS-(PP-4/EPM-2) as the graft resin composition (K), PA-1 as the polyamide resin (F), E.-MA.GMA-1 as the epoxy group containing copolymer (G) in addition to the copolymer, PP-3 described above, and the properties of the composition were evaluated.

Table 33-2 shows the results. Using the above-mentioned propylene block copolymer as the polypropylene (C) greatly improved the fluidity of the resulting composition, giving a desirable results with regard to both the fluidity and the physical properties.

TABLE 1-1

| Constituent Thermoplastic resin comp. No. | Graft polypropylene (A) M-PP-1 | Polyamide resin (F) PA-1 | Epoxy group containing copolymer (G) E.VA.GMA-1 | Modified rubber-like material (I) M-EPM-1 |
|---|---|---|---|---|
| Example 1 | 65 | 10 | 2 | 23 |
| Example 2 | 55 | 20 | 2 | 23 |
| Example 3 | 45 | 30 | 2 | 23 |
| Example 4 | 35 | 40 | 2 | 23 |
| Example 5 | 25 | 50 | 2 | 23 |
| Comparative Example 1 | 78 | 20 | 2 | — |

TABLE 1-2

| Physical properties Thermoplastic resin comp. No. | Specific gravity | Melt flow rate (g/10 min) | Tensile properties Strength at yield (kg/cm²) | Elongation at break (%) | Flexural properties Modulus of elasticity (kg/cm²) | Strength (kg/cm²) |
|---|---|---|---|---|---|---|
| Example 1 | 0.921 | 4.7 | 199 | 211 | 10,300 | 265 |
| Example 2 | 0.941 | 3.5 | 209 | 174 | 11,020 | 284 |
| Example 3 | 0.960 | 1.4 | 259 | 124 | 12,480 | 343 |
| Example 4 | 0.982 | 0.5 | 318 | 99 | 13,310 | 421 |
| Example 5 | 1.002 | 0.2 | 338 | 99 | 13,730 | 451 |
| Comparative Example 1 | 1.021 | 50 | 339 | 44 | 15,870 | 479 |

| Physical properties Thermoplastic resin comp. No. | Izod impact strength 23° C. (kg·cm/cm) | −30° C. | Penetration impact strength (YE/TE)*[1] 23° C. (J: joule) | −30° C. | Thermal deformation temp. (°C.) | Rockwell Hardness $H_R$ |
|---|---|---|---|---|---|---|
| Example 1 | 82.1 | 10.4 | 27/48 (D) | 24/43 (D) | 110 | 67 |
| Example 2 | 71.3 | 15.4 | 28/49 (D) | 23/35 (D~B) | 103 | 66 |

TABLE 1-2-continued

| | | | | | | |
|---|---|---|---|---|---|---|
| Example 3 | 71.4 | 14.8 | 29/48 (D) | 22/32 (D~B) | 104 | 69 |
| Example 4 | 68.6 | 13.9 | 32/49 (D) | 23/32 (D~B) | 130 | 82 |
| Example 5 | 63.2 | 17.9 | 34/56 (D) | 34/47 (D) | 104 | 88 |
| Comparative Example 1 | 3.0 | 1.8 | 5.4/6.7 (B) | 0.1/1 (B) | 129 | 103 |

Note: [*1] Penetration impact strength, YE denotes yield point energy, TE denotes total energy, (D) and (B) indicate the states of fracture: (D): ductile fracture, (B): brittle fracture, (D~B): intermediate fracture state between (B) and (D).

TABLE 2-1

| Constituent Thermoplastic resin comp. No. | Graft polypropylene (A) M-PP-1 | Polyamide resin (F) PA-1 | Epoxy group containing copolymer (G) E.VA.GMA-1 | Modified rubber-like material (I) M-EPM-1 |
|---|---|---|---|---|
| Example 6 | 50 | 20 | 2 | 28 |
| Example 7 | 60 | 20 | 2 | 23 |
| Example 8 | 65 | 20 | 2 | 13 |

TABLE 2-2

| Physical properties Thermoplastic resin comp. No. | Specific gravity | Melt flow rate (g/10 min) | Tensile properties Strength at yield (kg/cm$^2$) | Tensile properties Elongation at break (%) | Flexural properties Modulus of elasticity (kg/cm$^2$) | Flexural properties Strength (kg/cm$^2$) |
|---|---|---|---|---|---|---|
| Example 6 | 0.938 | 1.8 | 187 | 144 | 9,600 | 240 |
| Example 7 | 0.944 | 5.6 | 243 | 153 | 12,500 | 333 |
| Example 8 | 0.946 | 8.4 | 310 | 49 | 14,100 | 381 |

| Physical properties Thermoplastic resin comp. No. | Izod impact strength 23° C. (kg·cm/cm) | Izod impact strength −30° C. (kg·cm/cm) | Penetration impact strength (YE/TE)[*1] 23° C. (J: joule) | Penetration impact strength (YE/TE)[*1] −30° C. (J: joule) | Thermal deformation temp. (°C.) | Rockwell Hardness H$_R$ |
|---|---|---|---|---|---|---|
| Example 6 | 72.3 | 25.4 | 30/52 (D) | 24/37 (D~B) | 95 | 54 |
| Example 7 | 67.2 | 11.1 | 31/54 (D) | 22/34 (D~B) | 112 | 75 |
| Example 8 | 10.8 | 7.8 | 33/58 (D) | 8/13 (B) | 124 | 82 |

Note: [*1] Penetration impact strength, YE denotes yield point energy, TE denotes total energy, (D) and (B) indicate the states of fracture: (D): ductile fracture, (B): brittle fracture, (D~B): intermediate fracture state between (B) and (D).

TABLE 3-1

| Constituent Thermoplastic resin comp. No. | Graft polypropylene (A) M-PP-1 | Polyamide resin (F) PA-1 | Epoxy group containing copolymer (G) E.VA.GMA-1 | Modified rubber-like material (I) M-EPM-1 |
|---|---|---|---|---|
| Example 9 | 55 | 20 | 5 | 20 |
| Example 10 | 55 | 20 | 1 | 24 |
| Comparative Example 2 | 55 | 20 | 0 | 25 |

TABLE 3-2

| Physical properties Thermoplastic resin comp. No. | Specific gravity | Melt flow rate (g/10 min) | Tensile properties Strength at yield (kg/cm$^2$) | Tensile properties Elongation at break (%) | Flexural properties Modulus of elasticity (kg/cm$^2$) | Flexural properties Strength (kg/cm$^2$) |
|---|---|---|---|---|---|---|
| Example 9 | 0.942 | 1.6 | 219 | 229 | 11,350 | 289 |
| Example 10 | 0.941 | 5.8 | 204 | 167 | 10,690 | 275 |
| Comparative Example 2 | 0.941 | 10.9 | 181 | 112 | 9,840 | 248 |

| Physical properties Thermoplastic resin comp. No. | Izod impact strength 23° C. (kg·cm/cm) | Izod impact strength −30° C. (kg·cm/cm) | Penetration impact strength (YE/TE)[*1] 23° C. (J: joule) | Penetration impact strength (YE/TE)[*1] −30° C. (J: joule) | Thermal deformation temp. (°C.) | Rockwell Hardness H$_R$ |
|---|---|---|---|---|---|---|
| Example 9 | 68.7 | 12.5 | 28/49 (D) | 17/26 (D) | 113 | 68 |
| Example 10 | 77.9 | 14.0 | 28/52 (D) | 22/33 (D~B) | 103 | 63 |
| Comparative Example 2 | 47.2 | 12.4 | 25/40 (D) | 8/11 (B) | 93 | 56 |

Note: [*1] Penetration impact strength, YE denotes yield point energy, TE denotes total energy, (D) and (B) indicate the states of fracture: (D): ductile fracture, (B): brittle fracture, (D~B): intermediate fracture state between (B) and (D).

TABLE 4-1

| Constituent Thermoplastic resin comp. No. | Graft polypropylene (A) M-PP-2 | Polyamide resin (F) PA-1 | Epoxy group containing copolymer (G) E.VA.GMA-1 | Modified rubber-like material (I) M-EPM-1 |
|---|---|---|---|---|
| Example 11 | 55 | 20 | 2 | 23 |

TABLE 4-2

| Physical properties<br>Thermoplastic<br>resin comp. No. | Specific gravity | Melt flow<br>rate<br>(g/10 min) | Tensile properties | | Flexural properties | |
|---|---|---|---|---|---|---|
| | | | Strength at yield (kg/cm$^2$) | Elongation at break (%) | Modulus of elasticity (kg/cm$^2$) | Strength (kg/cm$^2$) |
| Example 11 | 0.939 | 3.4 | 225 | 148 | 12,140 | 321 |

| Physical properties<br>Thermoplastic<br>resin comp. No. | Izod impact strength | | Penetration impact strength (YE/TE)*[1] | | Thermal deformation temp. (°C.) | Rockwell Hardness H$_R$ |
|---|---|---|---|---|---|---|
| | 23° C. (kg · cm/cm) | −30° C. | 23° C. (J: joule) | −30° C. | | |
| Example 11 | 79.5 | 15.0 | 27/53 (D) | 22/34 (D~B) | 108 | 68 |

Note: *[1]Penetration impact strength, YE denotes yield point energy, TE denotes total energy, (D) and (B) indicate the states of fracture: (D): ductile fracture, (B): brittle fracture, (D~B): intermediate fracture state between (B) and (D).

TABLE 5-1

| Constituent<br>Thermoplastic<br>resin comp. No. | Graft polypropylene (A)<br>M-PP-2 | Polyamide resin (F)<br>PA-1 | Epoxy group containing copolymer (G)<br>E.VA.GMA-1 | Modified rubber-like material (I)<br>M-EPM-2 |
|---|---|---|---|---|
| Example 12 | 55 | 20 | 2 | 23 |

TABLE 5-2

| Physical properties<br>Thermoplastic<br>resin comp. No. | Specific gravity | Melt flow<br>rate<br>(g/10 min) | Tensile properties | | Flexural properties | |
|---|---|---|---|---|---|---|
| | | | Strength at yield (kg/cm$^2$) | Elongation at break (%) | Modulus of elasticity (kg/cm$^2$) | Strength (kg/cm$^2$) |
| Example 12 | 0.937 | 2.0 | 201 | 128 | 10,510 | 383 |

| Physical properties<br>Thermoplastic<br>resin comp. No. | Izod impact strength | | Penetration impact strength (YE/TE)*[1] | | Thermal deformation temp. (°C.) | Rockwell Hardness H$_R$ |
|---|---|---|---|---|---|---|
| | 23° C. (kg · cm/cm) | −30° C. | 23° C. (J: joule) | −30° C. | | |
| Example 12 | 75.8 | 18.1 | 26/50 (D) | 23/38 (D~B) | 101 | 56 |

Note: *[1]Penetration impact strength, YE denotes yield point energy, TE denotes total energy, (D) and (B) indicate the states of fracture: (D): ductile fracture, (B): brittle fracture, (D~B): intermediate fracture state between (B) and (D).

TABLE 6-1

| Constituent<br>Thermoplastic<br>resin comp. No. | Graft polypropylene (A)<br>M-PP-2 | Polyamide resin (F)<br>PA-1 | Epoxy group containing copolymer (G)<br>E.MA.GMA-1 | Modified rubber-like material (I)<br>M-EPM-2 |
|---|---|---|---|---|
| Example 13 | 55 | 20 | 2 | 23 |

TABLE 6-2

| Physical properties<br>Thermoplastic<br>resin comp. No. | Specific gravity | Melt flow<br>rate<br>(g/10 min) | Tensile properties | | Flexural properties | |
|---|---|---|---|---|---|---|
| | | | Strength at yield (kg/cm$^2$) | Elongation at break (%) | Modulus of elasticity (kg/cm$^2$) | Strength (kg/cm$^2$) |
| Example 13 | 0.937 | 1.7 | 192 | 148 | 10,070 | 360 |

| Physical properties<br>Thermoplastic<br>resin comp. No. | Izod impact strength | | Penetration impact strength (YE/TE)*[1] | | Thermal deformation temp. (°C.) | Rockwell Hardness H$_R$ |
|---|---|---|---|---|---|---|
| | 23° C. (kg · cm/cm) | −30° C. | 23° C. (J: joule) | −30° C. | | |
| Example 13 | 89.4 | 24.5 | 28/55 (D) | 30/54 (D) | 101 | 54 |

Note: *[1]Penetration impact strength, YE denotes yield point energy, TE denotes total energy, (D) and (B) indicate the states of fracture: (D): ductile fracture, (B): brittle fracture.

TABLE 7-1

| Constituent<br>Thermoplastic<br>resin comp. No. | Graft polypropylene (A)<br>M-PP-1 | Polypropylene (C)<br>PP-1 | Polyamide resin (F)<br>PA-1 | Epoxy group containing copolymer (G)<br>E.VA.GMA-1 | Modified rubber-like material (I)<br>M-EPM-1 |
|---|---|---|---|---|---|
| Example 14 | 35 | 20 | 20 | 2 | 23 |

TABLE 7-2

| Physical properties<br>Thermoplastic<br>resin comp. No. | Specific gravity | Melt flow<br>rate<br>(g/10 min) | Tensile properties | | Flexural properties | |
|---|---|---|---|---|---|---|
| | | | Strength at yield (kg/cm$^2$) | Elongation at break (%) | Modulus of elasticity (kg/cm$^2$) | Strength (kg/cm$^2$) |
| Example 14 | 1.061 | 2.7 | 221 | 79 | 9,970 | 302 |

TABLE 7-2-continued

| Physical properties | Izod impact strength | | Penetration impact strength (YE/TE)[*1] | | Thermal deformation temp. (°C.) | Rockwell Hardness $H_R$ |
|---|---|---|---|---|---|---|
| Thermoplastic resin comp. No. | 23° C. (kg · cm/cm) | −30° C. | 23° C. (J: joule) | −30° C. | | |
| Example 14 | 36.6 | 7.3 | 28/45 (D) | 15/17 (B) | 106 | 68 |

Note: [*1]Penetration impact strength, YE denotes yield point energy, TE denotes total energy, (D) and (B) indicate the states of fracture: (D): ductile fracture, (B): brittle fracture.

TABLE 8-1

| Constituent Thermoplastic resin comp. No. | Graft resin composition (J) M-(PP-2/EPM-2) | Polyamide resin (F) PA-1 | Epoxy group containing copolymer (G) E.VA.GMA-1 |
|---|---|---|---|
| Example 15 | 55  23 | 20 | 2 |

TABLE 8-2

| Physical properties Thermoplastic resin comp. No. | Specific gravity | Melt flow rate (g/10 min) | Tensile properties | | Flexural properties | |
|---|---|---|---|---|---|---|
| | | | Strength at yield (kg/cm²) | Elongation at break (%) | Modulus of elasticity (kg/cm²) | Strength (kg/cm²) |
| Example 15 | 0.937 | 0.1 | 188 | 300 | 8,190 | 213 |

| Physical properties | Izod impact strength | | Penetration impact strength (YE/TE)[*1] | | Thermal deformation temp. (°C.) | Rockwell Hardness $H_R$ |
|---|---|---|---|---|---|---|
| Thermoplastic resin comp. No. | 23° C. (kg · cm/cm) | −30° C. | 23° C. (J: joule) | −30° C. | | |
| Example 15 | 87.8 | 26.4 | 30/51 (D) | 31/56 (D) | 98 | 41 |

Note: [*1]Penetration impact strength, YE denotes yield point energy, TE denotes total energy, (D) and (B) indicate the states of fracture: (D): ductile fracture, (B): brittle fracture.

TABLE 9-1

| Constituent Thermoplastic resin comp. No. | Graft polypropylene (A) M-PP-1 | Polyamide resin (F) PA-1 | Epoxy group containing copolymer (G) E.VA.GMA-1 | Modified rubber-like material (I) MS-EPM-1 |
|---|---|---|---|---|
| Example 16 | 65 | 10 | 2 | 23 |
| Example 17 | 55 | 20 | 2 | 23 |
| Example 18 | 45 | 30 | 2 | 23 |
| Example 19 | 35 | 40 | 2 | 23 |
| Example 20 | 25 | 50 | 2 | 23 |

TABLE 9-2

| Physical properties Thermoplastic resin comp. No. | Specific gravity | Melt flow rate (g/10 min) | Tensile properties | | Flexural properties | | Izod impact strength | |
|---|---|---|---|---|---|---|---|---|
| | | | Strength at yield (kg/cm²) | Elongation at break (%) | Modulus of elasticity (kg/cm²) | Strength (kg/cm²) | 23° C. (kg · cm/cm) | −30° C. |
| Example 16 | 0.921 | 18.8 | 200 | 170 | 9,900 | 270 | 80 | 8.1 |
| Example 17 | 0.941 | 7.9 | 220 | 140 | 10,600 | 290 | 69 | 12.0 |
| Example 18 | 0.960 | 3.2 | 260 | 100 | 12,000 | 350 | 67 | 12.2 |
| Example 19 | 0.982 | 1.3 | 320 | 80 | 12,800 | 430 | 48 | 12.2 |
| Example 20 | 1.002 | 0.5 | 340 | 80 | 13,200 | 460 | 42 | 14.0 |

| Physical properties Thermoplastic resin comp. No. | Penetration impact strength (YE/TE)[*1] | | Thermal deformation temp. (°C.) | Rockwell hardness $H_R$ |
|---|---|---|---|---|
| | 23° C. (J: joule) | −30° C. | | |
| Example 16 | 30/42(D) | 26/38(D~B) | 110 | 68 |
| Example 17 | 31/43(D) | 25/31(D~B) | 103 | 67 |
| Example 18 | 32/42(D) | 24/28(B) | 103 | 70 |
| Example 19 | 35/43(D) | 26/28(B) | 130 | 84 |
| Example 20 | 38/54(D) | 37/42(D) | 104 | 90 |

Note:
[*1]Penetration impact strength, YE denotes yield point energy, TE denotes total energy, (D) and (B) indicate the states of fracture: (D): ductile fracture, (B): brittle fracture, (D~B): intermediate fracture state between (B) and (D).

TABLE 10-1

| Constituent Thermoplastic resin comp. No. | Graft polypropylene (A) M-PP-1 | Polyamide resin (F) PA-1 | Epoxy group containing copolymer (G) E.VA.GMA-1 | Modified rubber-like material (I) MS-SEBS-1 |
|---|---|---|---|---|
| Example 21 | 55 | 20 | 2 | 23 |

TABLE 10-2

| Physical properties Thermoplastic resin comp. No. | Specific gravity | Melt flow rate (g/10 min) | Tensile properties | | Flexural properties | | Izod impact strength | |
|---|---|---|---|---|---|---|---|---|
| | | | Strength at yield (kg/cm²) | Elongation at break (%) | Modulus of elasticity (kg/cm²) | Strength (kg/cm²) | 23° C. (kg · cm/cm) | −30° C. (kg · cm/cm) |
| Example 21 | 1.064 | 17.5 | 155 | 201 | 5,700 | 182 | 39.9 | 18.1 |

| Physical properties Thermoplastic resin comp. No. | Penetration impact strength (YE/TE)*¹ | | Thermal deformation temp. (°C.) | Rockwell hardness $H_R$ |
|---|---|---|---|---|
| | 23° C. (J: joule) | −30° C. | | |
| Example 21 | 31/50(D) | 34/43(D) | 84 | 49 |

Note:
*¹Penetration impact strength, YE denotes yield point energy, TE denotes total energy, (D) and (B) indicate the states of fracture: (D): ductile fracture, (B): brittle fracture.

TABLE 11-1

| Constituent Thermoplastic resin comp. No. | Graft polypropylene (A) M-PP-1 | Polyamide resin (F) PA-1 | Epoxy group containing complymer (G) E.VA.GMA-1 | Modified rubber-like material (I) MS-EPM-1 | Filler (L) PA.GF-1 |
|---|---|---|---|---|---|
| Example 22 | 51 | 16 | 2 | 23 | 8 |

TABLE 11-2

| Physical properties Thermoplastic resin comp. No. | Specific gravity | Melt flow rate (g/10 min) | Tensile properties | | Flexural properties | | Izod impact strength | |
|---|---|---|---|---|---|---|---|---|
| | | | Strength at yield (kg/cm²) | Elongation at break (%) | Modulus of elasticity (kg/cm²) | Strength (kg/cm²) | 23° C. (kg · cm/cm) | −30° C. (kg · cm/cm) |
| Example 22 | 1.038 | 6.0 | 202 | 11 | 12,810 | 328 | 15.5 | 6.3 |

| Physical properties Thermoplastic resin comp. No. | Penetration impact strength (YE/TE)*¹ | | Thermal deformation temp. (°C.) | Rockwell hardness $H_R$ |
|---|---|---|---|---|
| | 23° C. (J: joule) | −30° C. | | |
| Example 22 | 6.6/13.3(B) | 0.2/3(B) | 147 | 75 |

Note:
*¹Penetration impact strength, YE denotes yield point energy, TE denotes total energy, (D) and (B) indicate the states of fracture: (D): ductile fracture, (B): brittle fracture.

TABLE 12-1

| Constituent Thermoplastic resin comp. No. | Graft polypropylene (A) M-PP-1 | Polyamide resin (F) PA-1 | Epoxy group containing complymer (G) E.VA.GMA-1 | Modified rubber-like material (I) MS-EPM-1 | Rubber-like material (H) EPM-1 |
|---|---|---|---|---|---|
| Example 23 | 55 | 29 | 2 | 23 | — |
| Example 24 | 55 | 20 | 2 | — | 23 |

TABLE 12-2

| Physical properties Thermoplastic resin comp. No. | Specific gravity | Melt flow rate (g/10 min) | Tensile properties | | Flexural properties | | Izod impact strength | |
|---|---|---|---|---|---|---|---|---|
| | | | Strength at yield (kg/cm²) | Elongation at break (%) | Modulus of elasticity (kg/cm²) | Strength (kg/cm²) | 23° C. (kg · cm/cm) | −30° C. (kg · cm/cm) |
| Example 23 | 0.929 | 2.3 | 196 | 201 | 8,910 | 231 | 75.1 | 16.5 |
| Example 24 | 0.942 | 4.0 | 212 | 160 | 11,500 | 288 | 65.5 | 13.5 |

| Physical properties Thermoplastic resin comp. No. | Penetration impact strength (YE/TE)*¹ | | Thermal deformation temp. (°C.) | Rockwell hardness $H_R$ |
|---|---|---|---|---|
| | 23° C. (J: joule) | −30° C. | | |
| Example 23 | 26/50(D) | 21/32(D~B) | 91 | 57 |

TABLE 12-2-continued

| | | | | |
|---|---|---|---|---|
| Example 24 | 24/48(D) | 20/29(D~B) | 93 | 58 |

Note:
*¹Penetration impact strength, YE denotes yield point energy, TE denotes total energy, (D) and (B) indicate the states of fracture: (D): ductile fracture, (B): brittle fracture, (D~B): intermediate fracture state between (B) and (D).

TABLE 13-1

| Constituent Thermoplastic resin comp. No. | Graft polypropylene (A) M-PP-1 | Polyamide resin (F) PA-3 | Epoxy group containing copolymer (G) E.VA.GMA-1 | Modified rubber-like material (I) MS-EPM-1 |
|---|---|---|---|---|
| Example 25 | 37 | 30 | 5 | 28 |

TABLE 13-2

| Physical properties Thermoplastic resin comp. No. | Specific gravity | Melt flow rate (g/10 min) | Tensile properties | | Flexural properties | | Izod impact strength | |
|---|---|---|---|---|---|---|---|---|
| | | | Strength at yield (kg/cm²) | Elongation at break (%) | Modulus of elasticity (kg/cm²) | Strength (kg/cm²) | 23° C. | −30° C. (kg · cm/cm) |
| Example 25 | 0.957 | 0.01 | 152 | 200 | 3,800 | 138 | 78.1 | 24.2 |

| Physical properties Thermoplastic resin comp. No. | Penetration impact strength (YE/TE)*¹ | | Thermal deformation temp. (°C.) | Rockwell hardness $H_R$ |
|---|---|---|---|---|
| | 23° C. | −30° C. (J: joule) | | |
| Example 25 | 27/47(D) | 28/45(D~B) | 73 | 43 |

Note:
*¹Penetration impact strength, YE denotes yield point energy, TE denotes total energy, (D) and (B) indicate the states of fracture: (D): ductile fracture, (B): brittle fracture, (D~B): intermediate fracture state between (B) and (D).

TABLE 14-1

| Constituent Thermoplastic resin comp. No. | Graft polypropylene (A) M-PP-1 | Polyamide resin (F) PA-3 | Epoxy group containing copolymer (G) E.VA.GMA-1 | Modified rubber-like material (I) MS-SEBS-1 |
|---|---|---|---|---|
| Example 26 | 37 | 30 | 5 | 28 |

TABLE 14-2

| Physical properties Thermoplastic resin comp. No. | Specific gravity | Melt flow rate (g/10 min) | Tensile properties | | Flexural properties | | Izod impact strength | |
|---|---|---|---|---|---|---|---|---|
| | | | Strength at yield (kg/cm²) | Elongation at break (%) | Modulus of elasticity (kg/cm²) | Strength (kg/cm²) | 23° C. | −30° C. (kg · cm/cm) |
| Example 26 | 0.958 | 0.01 | 145 | 250 | 3,200 | 132 | 90.1 | 29.2 |

| Physical properties Thermoplastic resin comp. No. | Penetration impact strength (YE/TE)*¹ | | Thermal deformation temp. (°C.) | Rockwell hardness $H_R$ |
|---|---|---|---|---|
| | 23° C. | −30° C. (J: joule) | | |
| Example 26 | 29/48(D) | 30/46(D) | 70 | 40 |

Note:
*¹Penetration impact strength, YE denotes yield point energy, TE denotes total energy, (D) and (B) indicate the states of fracture: (D): ductile fracture, (B): brittle fracture.

TABLE 15-1

| Constituent Thermoplastic resin comp. No. | Graft polypropylene (A) M-PP-1 | Polyamide resin (F) PA-1 | Epoxy group containing complymer (G) E.VA.GMA-1 | Modified rubber-like material (I) MS-EPM-1 | Filler (L) TALC-1 |
|---|---|---|---|---|---|
| Example 27 | 15 | 50 | 2 | 23 | 10 |

TABLE 15-2

| Physical properties Thermoplastic resin comp. No. | Specific gravity | Melt flow rate (g/10 min) | Tensile properties | | Flexural properties | | Izod impact strength | |
|---|---|---|---|---|---|---|---|---|
| | | | Strength at yield (kg/cm²) | Elongation at break (%) | Modulus of elasticity (kg/cm²) | Strength (kg/cm²) | 23° C. | −30° C. (kg · cm/cm) |
| Example 27 | 1.067 | 0.3 | 350 | 36 | 17,400 | 500 | 22.0 | 13.0 |

| Physical properties | Penetration impact strength (YE/TE)*¹ | Thermal deformation | Rockwell |

TABLE 15-2-continued

| | Thermoplastic resin comp. No. | 23° C. (J: joule) | −30° C. | tion temp. (°C.) | hardness H$_R$ |
|---|---|---|---|---|---|
| | Example 27 | 38/43(D) | 32/36(D) | 197 | 90 |

Note:
*¹Penetration impact strength, YE denotes yield point energy, TE denotes total energy, (D) and (B) indicate the states of fracture: (D): ductile fracture, (B): brittle fracture.

TABLE 16-1

| Constituent Thermoplastic resin comp. No. | Graft polypropylene (B) MS-PP-1 | Polyamide resin (F) PA-1 | Epoxy group containing copolymer (G) E.V.A.GMA-1 | Modified rubber-like material (I) MS-EPM-1 |
|---|---|---|---|---|
| Example 28 | 65 | 10 | 2 | 23 |
| Example 29 | 55 | 20 | 2 | 23 |
| Example 30 | 45 | 30 | 2 | 23 |
| Example 31 | 35 | 40 | 2 | 23 |
| Example 32 | 25 | 50 | 2 | 23 |
| Comparative Example 3 | 78 | 20 | 2 | — |

TABLE 16-2

| Physical properties Thermoplastic resin comp. No. | Specific gravity | Melt flow rate (g/10 min) | Tensile properties | | Flexural properties | | Izod impact strength | |
|---|---|---|---|---|---|---|---|---|
| | | | Strength at yield (kg/cm²) | Elongation at break (%) | Modulus of elasticity (kg/cm²) | Strength (kg/cm²) | 23° C. (kg · cm/cm) | −30° C. (kg · cm/cm) |
| Example 28 | 0.919 | 9.6 | 175 | 248 | 9,500 | 249 | 75.5 | 7.3 |
| Example 29 | 0.939 | 4.0 | 193 | 204 | 10,170 | 267 | 65.1 | 10.8 |
| Example 30 | 0.958 | 1.6 | 228 | 146 | 11,510 | 322 | 64.3 | 11.1 |
| Example 31 | 0.980 | 0.6 | 281 | 83 | 12,280 | 396 | 45.2 | 10.9 |
| Example 32 | 1.001 | 0.3 | 298 | 83 | 12,660 | 424 | 39.6 | 12.6 |
| Comparative Example 3 | 1.018 | 6.2 | 318 | >400 | 15,090 | 434 | 3.9 | 2.2 |

| Physical properties Thermoplastic resin comp. No. | Penetration impact strength (YE/TE)*¹ | | Thermal deformation temp. (°C.) | Rockwell hardness H$_R$ |
|---|---|---|---|---|
| | 23° C. (J: joule) | −30° C. | | |
| Example 28 | 26/34(D~B) | 26/39(D~B) | 109 | 75 |
| Example 29 | 27/35(D~B) | 25/32(D~B) | 102 | 74 |
| Example 30 | 28/34(D~B) | 24/39(B) | 102 | 78 |
| Example 31 | 31/35(D~B) | 25/27(B) | 129 | 84 |
| Example 32 | 33/44(D) | 37/43(D) | 103 | 89 |
| Comparative | 31/48(D) | 0/2(B) | 123 | 102 |

Note:
*¹Penetration impact strength, YE denotes yield point energy, TE denotes total energy, (D) and (B) indicate the states of fracture: (D): ductile fracture, (B): brittle fracture, (D~B): intermediate fracture state between (B) and (D).

TABLE 17-1

| Constituent Thermoplastic resin comp. No. | Graft polypropylene (A) MS-PP-1 | Polyamide resin (F) PA-1 | Epoxy group containing copolymer (G) E.V.A.GMA-1 | Modified rubber-like material (I) MS-EPM-1 |
|---|---|---|---|---|
| Example 33 | 50 | 20 | 2 | 28 |
| Example 34 | 60 | 20 | 2 | 18 |
| Example 35 | 65 | 20 | 2 | 13 |

TABLE 17-2

| Physical properties Thermoplastic resin comp. No. | Specific gravity | Melt flow rate (g/10 min) | Tensile properties | | Flexural properties | | Izod impact strength | |
|---|---|---|---|---|---|---|---|---|
| | | | Strength at yield (kg/cm²) | Elongation at break (%) | Modulus of elasticity (kg/cm²) | Strength (kg/cm²) | 23° C. (kg · cm/cm) | −30° C. (kg · cm/cm) |
| Example 33 | 0.936 | 2.1 | 173 | 169 | 8,860 | 226 | 66.0 | 17.8 |
| Example 34 | 0.942 | 6.2 | 224 | 179 | 11,540 | 313 | 61.4 | 7.8 |
| Example 35 | 0.944 | 9.5 | 246 | 58 | 13,010 | 358 | 9.9 | 5.5 |

| Physical properties Thermoplastic resin comp. No. | Penetration impact strength (YE/TE)*¹ | | Thermal deformation temp. (°C.) | Rockwell hardness H$_R$ |
|---|---|---|---|---|
| | 23° C. (J: joule) | −30° C. | | |
| Example 33 | 29/37(D~B) | 27/34(D~B) | 95 | 62 |
| Example 34 | 30/39(D~B) | 31/39(D~B) | 111 | 85 |

TABLE 17-2-continued

| | | | | |
|---|---|---|---|---|
| | Example 35 | 32.42(D) | 9/12(B) | 123 | 93 |

Note:
*[1] Penetration impact strength, YE denotes yield point energy, TE denotes total energy, (D) and (B) indicate the states of fracture: (D): ductile fracture, (B): brittle fracture, (D~B): intermediate fracture state between (B) and (D).

TABLE 18-1

| Constituent Thermoplastic resin comp. No. | Graft polypropylene (B) MS-PP-1 | Polyamide resin (F) PA-1 | Epoxy group containing copolymer (G) E.VA.GMA-1 | Modified rubber-like material (I) MS-EPM-1 |
|---|---|---|---|---|
| Example 36 | 55 | 20 | 5 | 20 |
| Example 37 | 55 | 20 | 1 | 24 |
| Comparative Example 4 | 55 | 20 | 0 | 25 |

TABLE 18-2

| Physical properties Thermoplastic resin comp. No. | Specific gravity | Melt flow rate (g/10 min) | Tensile properties | | Flexural properties | |
|---|---|---|---|---|---|---|
| | | | Strength at yield (kg/cm$^2$) | Elongation at break (%) | Modulus of elasticity (kg/cm$^2$) | Strength (kg/cm$^2$) |
| Example 36 | 0.941 | 1.7 | 233 | 200 | 12,590 | 140 |
| Example 37 | 0.939 | 8.0 | 217 | 146 | 11,870 | 133 |
| Comparative Example 4 | 0.939 | 15.4 | 188 | 98 | 10,920 | 120 |

| Physical properties Thermoplastic resin comp. No. | Izod impact strength | | Penetration impact strength (YE/TE)*[1] | | Thermal deformation temp. (°C.) | Rockwell hardness $H_R$ |
|---|---|---|---|---|---|---|
| | 23° C. (kg · cm/cm) | −30° C. | 23° C. (J: joule) | −30° C. | | |
| Example 36 | 77.1 | 8.4 | 27/35(D~B) | 19/23(B) | 125 | 83 |
| Example 37 | 73.3 | 9.1 | 27/37(D~B) | 25/30(B) | 114 | 77 |
| Comparative Example 4 | 53.1 | 8.3 | 24/28(B) | 8/10(B) | 103 | 68 |

Note:
*[1] Penetration impact strength, YE denotes yield point energy, TE denotes total energy, (D) and (B) indicate the states of fracture: (D): ductile fracture, (B): brittle fracture, (D~B): intermediate fracture state between (B) and (D).

TABLE 19-1

| Constituent Thermoplastic resin comp. No. | Graft polypropylene (B) MS-PP-1 | Polyamide resin (F) PA-1 | Epoxy group containing copolymer (G) E.VA.GMA-1 | Modified rubber-like material (I) MS-EPM-1 |
|---|---|---|---|---|
| Example 38 | 55 | 20 | 2 | 23 |

TABLE 19-2

| Physical properties Thermoplastic resin comp. No. | Specific gravity | Melt flow rate (g/10 min) | Tensile properties | | Flexural properties | |
|---|---|---|---|---|---|---|
| | | | Strength at yield (kg/cm$^2$) | Elongation at break (%) | Modulus of elasticity (kg/cm$^2$) | Strength (kg/cm$^2$) |
| Example 38 | 0.939 | 3.9 | 208 | 173 | 11,200 | 302 |

| Physical properties Thermoplastic resin comp. No. | Izod impact strength | | Penetration impact strength (YE/TE)*[1] | | Thermal deformation temp. (°C.) | Rockwell hardness $H_R$ |
|---|---|---|---|---|---|---|
| | 23° C. (kg · cm/cm) | −30° C. | 23° C. (J: joule) | −30° C. | | |
| Example 38 | 72.6 | 10.5 | 26/36(D~B) | 25/31 (D~B) | 108 | 77 |

Note:
*[1] Penetration impact strength, YE denotes yield point energy, TE denotes total energy, (D) and (B) indicate the states of fracture: (D): ductile fracture, (B): brittle fracture, (D~B): intermediate fracture state between (B) and (D).

TABLE 20-1

| Constituent Thermoplastic resin comp. No. | Graft polypropylene (B) MS-PP-2 | Polyamide resin (F) PA-1 | Epoxy group containing copolymer (G) E.VA.GMA-1 | Modified rubber-like material (I) MS-EPM-2 |
|---|---|---|---|---|
| Example 39 | 55 | 20 | 2 | 23 |

TABLE 20-2

| Physical properties Thermoplastic resin comp. No. | Specific gravity | Melt flow rate (g/10 min) | Tensile properties | | Flexural properties | |
|---|---|---|---|---|---|---|
| | | | Strength at yield (kg/cm$^2$) | Elongation at break (%) | Modulus of elasticity (kg/cm$^2$) | Strength (kg/cm$^2$) |
| Example 39 | 0.937 | 2.3 | 186 | 150 | 9,700 | 360 |

| Physical properties Thermoplastic resin comp. No. | Izod impact strength | | Penetration impact strength (YE/TE)*[1] | | Thermal deformation temp. (°C.) | Rockwell hardness $H_R$ |
|---|---|---|---|---|---|---|
| | 23° C. (kg · cm/cm) | −30° C. | 23° C. (J: joule) | −30° C. | | |
| Example 39 | 69.2 | 12.7 | 25/36(D~B) | 26/35 (D~B) | 100 | 64 |

Note:
*[1]Penetration impact strength, YE denotes yield point energy, TE denotes total energy, (D) and (B) indicate the states of fracture: (D): ductile fracture, (B): brittle fracture, (D~B): intermediate fracture state between (B) and (D).

TABLE 21-1

| Constituent Thermoplastic resin comp. No. | Graft polypropylene (B) MS-PP-2 | Polyamide resin (F) PA-1 | Epoxy group containing copolymer (G) E.MA.GMA-1 | Modified rubber-like material (I) MS-EPM-2 |
|---|---|---|---|---|
| Example 40 | 55 | 20 | 2 | 23 |

TABLE 21-2

| Physical properties Thermoplastic resin comp. No. | Specific gravity | Melt flow rate (g/10 min) | Tensile properties | | Flexural properties | |
|---|---|---|---|---|---|---|
| | | | Strength at yield (kg/cm$^2$) | Elongation at break (%) | Modulus of elasticity (kg/cm$^2$) | Strength (kg/cm$^2$) |
| Example 40 | 0.937 | 1.9 | 178 | 173 | 9,290 | 338 |

| Physical properties Thermoplastic resin comp. No. | Izod impact strength | | Penetration impact strength (YE/TE)*[1] | | Thermal deformation temp. (°C.) | Rockwell hardness $H_R$ |
|---|---|---|---|---|---|---|
| | 23° C. (kg · cm/cm) | −30° C. | 23° C. (J: joule) | −30° C. | | |
| Example 40 | 81.6 | 17.2 | 27/43(D) | 33/50(D) | 101 | 61 |

Note:
*[1]Penetration impact strength, YE denotes yield point energy, TE denotes total energy, (D) and (B) indicate the states of fracture: (D): ductile fracture, (B): brittle fracture.

TABLE 22-1

| Constituent Thermoplastic resin comp. No. | Graft polypropylene (B) MS-PP-2 | Polypropylene (C) PP-2 | Polyamide resin (F) PA-1 | Epoxy group containing copolymer (G) E.VA.GMA-1 | Modified rubber-like material (I) MS-EPM-1 |
|---|---|---|---|---|---|
| Example 41 | 35 | 20 | 20 | 2 | 23 |

TABLE 22-2

| Physical properties Thermoplastic resin comp. No. | Specific gravity | Melt flow rate (g/10 min) | Tensile properties | | Flexural properties | |
|---|---|---|---|---|---|---|
| | | | Strength at yield (kg/cm$^2$) | Elongation at break (%) | Modulus of elasticity (kg/cm$^2$) | Strength (kg/cm$^2$) |
| Example 41 | 1.029 | 1.5 | 240 | 106 | 11,810 | 333 |

| Physical properties Thermoplastic resin comp. No. | Izod impact strength | | Penetration impact strength (YE/TE)*[1] | | Thermal deformation temp. (°C.) | Rockwell hardness $H_R$ |
|---|---|---|---|---|---|---|
| | 23° C. (kg · cm/cm) | −30° C. | 23° C. (J: joule) | −30° C. | | |
| Example 41 | 52.9 | 7.1 | 22.9/29.4 | 2/3(B) | 117 | 77 |

TABLE 22-2-continued (D~B)

Note:
*[1]Penetration impact strength, YE denotes yield point energy, TE denotes total energy, (D) and (B) indicate the states of fracture: (D): ductile fracture, (B): brittle fracture, (D~B): intermediate fracture state between (B) and (D).

TABLE 23-1

| Constituent Thermoplastic resin comp. No. | Graft polypropylene (A) M-PP-1 | Graft polypropylene (B) MS-PP-1 | Polyamide resin (F) PA-1 | Epoxy group containing copolymer (G) E.VA.GMA-1 | Modified rubber-like material (I) MS-EPM-1 |
|---|---|---|---|---|---|
| Example 42 | 23 | 22 | 20 | 2 | 23 |

TABLE 23-2

| Physical properties Thermoplastic resin comp. No. | Specific gravity | Melt flow rate (g/10 min) | Tensile properties | | Flexural properties | |
|---|---|---|---|---|---|---|
| | | | Strength at yield (kg/cm$^2$) | Elongation at break (%) | Modulus of elasticity (kg/cm$^2$) | Strength (kg/cm$^2$) |
| Example 42 | 0.94 | 6.0 | 206 | 170 | 10,300 | 278 |

| Physical properties Thermoplastic resin comp. No. | Izod impact strength | | Penetration impact strength (YE/TE)*[1] | | Thermal deformation temp. (°C.) | Rockwell hardness $H_R$ |
|---|---|---|---|---|---|---|
| | 23° C. (kg · cm/cm) | −30° C. | 23° C. (J: joule) | −30° C. | | |
| Example 42 | 66 | 11.2 | 29/38(D~B) | 25/31 (D~B) | 102 | 70 |

Note:
*[1]Penetration impact strength, YE denotes yield point energy, TE denotes total energy, (D) and (B) indicate the states of fracture: (D): ductile fracture, (B): brittle fracture, (D~B): intermediate fracture state between (B) and (D).

TABLE 24-1

| Constituent Thermoplastic resin comp. No. | Graft resin composition (K) MS-(PP-2/EPM-2) | Polyamide resin (F) PA-1 | Epoxy group containing copolymer (G) E.MA.GMA-1 |
|---|---|---|---|
| Example 43 | 78 | 20 | 2 |

TABLE 24-2

| Physical properties Thermoplastic resin comp. No. | Specific gravity | Melt flow rate (g/10 min) | Tensile properties | | Flexural properties | |
|---|---|---|---|---|---|---|
| | | | Strength at yield (kg/cm$^2$) | Elongation at break (%) | Modulus of elasticity (kg/cm$^2$) | Strength (kg/cm$^2$) |
| Example 43 | 0.937 | 0.3 | 174 | 351 | 7,560 | 200 |

| Physical properties Thermoplastic resin comp. No. | Izod impact strength | | Penetration impact strength (YE/TE)*[1] | | Thermal deformation temp. (°C.) | Rockwell hardness $H_R$ |
|---|---|---|---|---|---|---|
| | 23° C. (kg · cm/cm) | −30° C. | 23° C. (J: joule) | −30° C. | | |
| Example 43 | 80.1 | 18.5 | 30/51(D) | 35/51(D) | 97 | 46 |

Note:
*[1]Penetration impact strength, YE denotes yield point energy, TE denotes total energy, (D) and (B) indicate the states of fracture: (D): ductile fracture, (B): brittle fracture.

TABLE 25-1

| Constituent Thermoplastic resin comp. No. | Graft polypropylene (B) MS-PP-2 | Polyamide resin (F) PA-1 | Epoxy group containing copolymer (G) E.VA.GMA-1 | Modified rubber-like material (I) MS-SEBS-1 |
|---|---|---|---|---|
| Example 44 | 55 | 20 | 2 | 23 |

TABLE 25-2

| Physical properties Thermoplastic resin comp. No. | Specific gravity | Melt flow rate (g/10 min) | Tensile properties | | Flexural properties | |
|---|---|---|---|---|---|---|
| | | | Strength at yield (kg/cm$^2$) | Elongation at break (%) | Modulus of elasticity (kg/cm$^2$) | Strength (kg/cm$^2$) |
| Example 44 | 1.051 | 2.5 | 206 | >500 | 7,880 | 228 |

| Physical | Izod impact | Penetration impact | Thermal |

TABLE 25-2-continued

| properties | strength | | strength (YE/TE)[*1] | | deforma- | Rockwell |
|---|---|---|---|---|---|---|
| Thermoplastic resin comp. No. | 23° C. (kg · cm/cm) | −30° C. | 23° C. (J: joule) | −30° C. | tion temp. (°C.) | hardness $H_R$ |
| Example 44 | 95.8 | 33.0 | 32/56(D) | 29/33 (D~B) | 93.9 | 63 |

Note:
[*1] Penetration impact strength, YE denotes yield point energy, TE denotes total energy, (D) and (B) indicate the states of fracture: (D): ductile fracture, (B): brittle fracture, (D~B): intermediate fracture state between (B) and (D).

TABLE 26-1

| Constituent Thermoplastic resin comp. No. | Graft polypropylene (B) MS-PP-2 | Polyamide resin (F) PA-1 | Epoxy group containing copolymer (G) E.VA.GMA-1 | Modified rubber-like material (I) MS-EPM-1 | Filler (L) PA.GF-1 |
|---|---|---|---|---|---|
| Example 45 | 50 | 15 | 2 | 23 | 10 |

TABLE 26-2

| Physical properties Thermoplastic resin comp. No. | Specific gravity | Melt flow rate (g/10 min) | Tensile properties | | Flexural properties | |
|---|---|---|---|---|---|---|
| | | | Strength at yield (kg/cm$^2$) | Elongation at break (%) | Modulus of elasticity (kg/cm$^2$) | Strength (kg/cm$^2$) |
| Example 45 | 1.003 | 2.5 | 284 | 9 | 16,960 | 412 |

| Physical properties Thermoplastic resin comp. No. | Izod impact strength | | Penetration impact strength (YE/TE)[*1] | | Thermal deforma- tion temp. (°C.) | Rockwell hardness $H_R$ |
|---|---|---|---|---|---|---|
| | 23° C. (kg · cm/cm) | −30° C. | 23° C. (J: joule) | −30° C. | | |
| Example 45 | 14.4 | 5.1 | 5/9(B) | 0/3(B) | 156 | 85 |

Note:
[*1] Penetration impact strength, YE denotes yield point energy, TE denotes total energy, (D) and (B) indicate the states of fracture: (D): ductile fracture, (B): brittle fracture.

TABLE 27-1

| Constituent Thermoplastic resin comp. No. | Graft polypropylene (B) MS-PP-1 | Polyamide resin (F) PA-2 | Epoxy group containing copolymer (G) E.VA.GMA-1 | Modified rubber-like material (I) MS-EPM-1 |
|---|---|---|---|---|
| Example 46 | 55 | 20 | 2 | 23 |

TABLE 27-2

| Physical properties Thermoplastic resin comp. No. | Specific gravity | Melt flow rate (g/10 min) | Tensile properties | | Flexural properties | |
|---|---|---|---|---|---|---|
| | | | Strength at yield (kg/cm$^2$) | Elongation at break (%) | Modulus of elasticity (kg/cm$^2$) | Strength (kg/cm$^2$) |
| Example 46 | 0.927 | 2.9 | 181 | 236 | 8,220 | 217 |

| Physical properties Thermoplastic resin comp. No. | Izod impact strength | | Penetration impact strength (YE/TE)[*1] | | Thermal deformation temp. (°C.) | Rockwell Hardness $H_R$ |
|---|---|---|---|---|---|---|
| | 23° C. (kg · cm/cm) | −30° C. | 23° C. (J: joule) | −30° C. | | |
| Example 46 | 68.6 | 11.6 | 25/36 (D~B) | 23/29 (B) | 91 | 64 |

Note: [*1] Penetration impact strength, YE denotes yield point energy, TE denotes total energy, (D) and (B) indicate the states of fracture: (D): ductile fracture, (B): brittle fracture, (D~B): intermediate fracture state between (B) and (D).

TABLE 28-1

| Constituent Thermoplastic resin comp. No. | Graft polypropylene (B) MS-PP-1 | Polyamide resin (F) PA-1 | Epoxy group containing copolymer (G) E.VA.GMA-1 | Modified rubber-like material (I) EPM-1 |
|---|---|---|---|---|
| Example 47 | 55 | 20 | 2 | 23 |

TABLE 28-2

| Physical properties Thermoplastic resin comp. No. | Specific gravity | Melt flow rate (g/10 min) | Tensile properties | | Flexural properties | |
|---|---|---|---|---|---|---|
| | | | Strength at yield (kg/cm$^2$) | Elongation at break (%) | Modulus of elasticity (kg/cm$^2$) | Strength (kg/cm$^2$) |
| Example 47 | 0.929 | 4.5 | 203 | 180 | 11,600 | 272 |

| Physical properties | Izod impact strength | Penetration impact strength (YE/TE)[*1] | Thermal |

TABLE 28-2-continued

| Thermoplastic resin comp. No. | 23° C. (kg·cm/cm) | −30° C. | 23° C. (J: joule) | −30° C. | deformation temp. (°C.) | Rockwell Hardness $H_R$ |
|---|---|---|---|---|---|---|
| Example 47 | 61.5 | 9.8 | 25/32 (D~B) | 22/29 (B) | 105 | 75 |

Note: *[1]Penetration impact strength, YE denotes yield point energy, TE denotes total energy, (D) and (B) indicate the states of fracture: (D): ductile fracture, (B): brittle fracture, (D~B): intermediate fracture state between (B) and (D).

TABLE 29-1

| Constituent Thermoplastic resin comp. No. | Graft polypropylene (B) MS-PP-1 | Polyamide resin (F) PA-3 | Epoxy group containing copolymer (G) E.VA.GMA-1 | Modified rubber-like material (I) MS-EPM-1 |
|---|---|---|---|---|
| Example 48 | 45 | 25 | 5 | 30 |

TABLE 29-2

| Physical properties Thermoplastic resin comp. No. | Specific gravity | Melt flow rate (g/10 min) | Strength at yield (kg/cm$^2$) | Elongation at break (%) | Modulus of elasticity (kg/cm$^2$) | Strength (kg/cm$^2$) |
|---|---|---|---|---|---|---|
| Example 48 | 0.955 | 1.5 | 160 | 180 | 4,100 | 145 |

| Physical properties Thermoplastic resin comp. No. | Izod impact strength 23° C. (kg·cm/cm) | −30° C. | Penetration impact strength (YE/TE)*[1] 23° C. (J: joule) | −30° C. | Thermal deformation temp. (°C.) | Rockwell Hardness $H_R$ |
|---|---|---|---|---|---|---|
| Example 48 | 75.1 | 22.3 | 26/45 (D) | 27/42 (B~D) | 75 | 45 |

Note: *[1]Penetration impact strength, YE denotes yield point energy, TE denotes total energy, (D) and (B) indicate the states of fracture: (D): ductile fracture, (B): brittle fracture, (D~B): intermediate fracture state between (B) and (D).

TABLE 30-1

| Constituent Thermoplastic resin comp. No. | Graft polypropylene (B) MS-PP-2 | Polyamide resin (F) PA-3 | Epoxy group containing copolymer (G) E.VA.GMA-1 | Modified rubber-like material (I) MS-SEBS-1 |
|---|---|---|---|---|
| Example 49 | 37 | 30 | 5 | 28 |

TABLE 30-2

| Physical properties Thermoplastic resin comp. No. | Specific gravity | Melt flow rate (g/10 min) | Strength at yield (kg/cm$^2$) | Elongation at break (%) | Modulus of elasticity (kg/cm$^2$) | Strength (kg/cm$^2$) |
|---|---|---|---|---|---|---|
| Example 49 | 0.958 | 0.01 | 150 | 230 | 3,500 | 138 |

| Physical properties Thermoplastic resin comp. No. | Izod impact strength 23° C. (kg·cm/cm) | −30° C. | Penetration impact strength (YE/TE)*[1] 23° C. (J: joule) | −30° C. | Thermal deformation temp. (°C.) | Rockwell Hardness $H_R$ |
|---|---|---|---|---|---|---|
| Example 49 | 85.1 | 27.5 | 30/49 (D) | 31/47 (D) | 73 | 42 |

Note: *[1]Penetration impact strength, YE denotes yield point energy, TE denotes total energy, (D) and (B) indicate the states of fracture: (D): ductile fracture, (B): brittle fracture.

TABLE 31-1

| Constituent Thermoplastic resin comp. No. | Graft polypropylene (B) MS-PP-2 | Polyamide resin (F) PA-1 | Epoxy group containing copolymer (G) E.VA.GMA-1 | Modified rubber-like material (I) MS-EPM-1 | Filler (L) TALC-1 |
|---|---|---|---|---|---|
| Example 50 | 15 | 50 | 2 | 23 | 10 |

TABLE 31-2

| Physical properties Thermoplastic resin comp. No. | Specific gravity | Melt flow rate (g/10 min) | Strength at yield (kg/cm$^2$) | Elongation at break (%) | Modulus of elasticity (kg/cm$^2$) | Strength (kg/cm$^2$) |
|---|---|---|---|---|---|---|
| Example 50 | 1.070 | 0.2 | 310 | 40 | 16,900 | 470 |

| Physical properties Thermoplastic resin comp. No. | Izod impact strength 23° C. (kg·cm/cm) | −30° C. | Penetration impact strength (YE/TE)*[1] 23° C. (J: joule) | −30° C. | Thermal deformation temp. (°C.) | Rockwell Hardness $H_R$ |
|---|---|---|---|---|---|---|

TABLE 31-2-continued

| | | | | | | |
|---|---|---|---|---|---|---|
| Example 50 | 20.0 | 11.5 | 33/43 (D) | 32/36 | 197 | 90 |

Note: *[1]Penetration impact strength, YE denotes yield point energy, TE denotes total energy, (D) and (B) indicate the states of fracture: (D): ductile fracture, (B): brittle fracture.

TABLE 32-1

| Constituent Thermoplastic resin comp. No. | Graft resin composition (K) MS-(PP-2/EBM-1) | Polyamide resin (F) PA-1 | Epoxy group containing copolymer (G) E.MA.GMA-1 |
|---|---|---|---|
| Example 51 | 78 | 20 | 2 |

TABLE 32-2

| Physical properties Thermoplastic resin comp. No. | Specific gravity | Melt flow rate (g/10 min) | Tensile properties | | Flexural properties | |
|---|---|---|---|---|---|---|
| | | | Strength at yield (kg/cm$^2$) | Elongation at break (%) | Modulus of elasticity (kg/cm$^2$) | Strength (kg/cm$^2$) |
| Example 51 | 0.937 | 0.38 | 200 | 250 | 7,300 | 200 |

| Physical properties Thermoplastic resin comp. No. | Izod impact strength | | Penetration impact strength (YE/TE)*[1] | | Thermal deformation temp. (°C.) | Rockwell Hardness $H_R$ |
|---|---|---|---|---|---|---|
| | 23° C. (kg · cm/cm) | −30° C. | 23° C. (J: joule) | −30° C. | | |
| Example 51 | 80.1 | 13.0 | 30/49 (D) | 30/53 (D) | 95 | 49 |

Note: *[1]Penetration impact strength, YE denotes yield point energy, TE denotes total energy, (D) and (B) indicate the states of fracture: (D): ductile fracture, (B): brittle fracture.

TABLE 33-1

| Constituent Thermoplastic resin comp. No. | Graft resin composition (K) MS-(PP-4/EPM-2) | Polyamide resin (F) PA-1 | Epoxy group containing copolymer (G) E.MA.GMA-1 | Polypropylene (C) PP-3 |
|---|---|---|---|---|
| Example 52 | 48 | 26 | 2 | 30 |

TABLE 33-2

| Physical properties Thermoplastic resin comp. No. | Specific gravity | Melt flow rate (g/10 min) | Tensile properties | | Flexural properties | |
|---|---|---|---|---|---|---|
| | | | Strength at yield (kg/cm$^2$) | Elongation at break (%) | Modulus of elasticity (kg/cm$^2$) | Strength (kg/cm$^2$) |
| Example 52 | 0.944 | 12.0 | 270 | 210 | 15,100 | 401 |

| Physical properties Thermoplastic resin comp. No. | Izod impact strength | | Penetration impact strength (YE/TE)*[1] | | Thermal deformation temp. (°C.) | Rockwell Hardness $H_R$ |
|---|---|---|---|---|---|---|
| | 23° C. (kg · cm/cm) | −30° C. | 23° C. (J: joule) | −30° C. | | |
| Example 52 | 22.0 | 2.8 | 38/43 (D) | 15/17 (B) | 124 | 90 |

Note: *[1]Penetration impact strength, YE denotes yield point energy, TE denotes total energy, (D) and (B) indicate the states of fracture: (D): ductile fracture, (B): brittle fracture.

What is claimed is:

1. A thermoplastic propylene resin composition comprising
100 parts by weight of a resin composition composed of 1 to 99% by weight of a polypropylene resin (E) selected from the group consisting of
  a graft polypropylene (A) obtained by graft copolymerizing an unsaturated carboxylic acid or a derivative thereof onto a polypropylene,
  a graft polypropylene (B) obtained by graft copolymerizing an unsaturated carboxylic acid or a derivative thereof and an unsaturated aromatic monomer onto a polypropylene,
  a mixture of a graft polypropylene (A) obtained by graft copolymerizing an unsaturated carboxylic acid or a derivative thereof onto a polypropylene and a graft polypropylene (B) obtained by graft copolymerizing an unsaturated carboxylic acid or a derivative thereof and an unsaturated aromatic monomer onto a polypropylene,
  a mixture of a graft polypropylene (A) obtained by graft copolymerizing an unsaturated carboxylic acid or a derivative thereof onto a polypropylene and a polypropylene (C),
  a mixture of a graft polypropylene (B) obtained by graft copolymerizing an unsaturated carboxylic acid or a derivative thereof and an unsaturated aromatic monomer onto a polypropylene and a polypropylene (C), and
  a mixture of a graft polypropylene (A) obtained by graft copolymerizing an unsaturated carboxylic acid or a derivative thereof onto a polypropylene, a graft polypropylene (B) obtained by graft copolymerizing an unsaturated carboxylic acid or a derivative thereof and an unsaturated aromatic monomer onto a polypropylene and a polypropylene (C),
and 99 to 1% by weight of a polyamide resin (F),
0.1 to 300 parts by weight an epoxy group containing copolymer (G), and
0.1 to 300 parts by weight of a rubber material (H) and/or a modified rubber material (I), the content of the polyamide resin (F) in the thermoplastic propylene resin composition being less than 60% by weight.

2. A thermoplastic propylene resin composition according to claim 1, which further comprises up to 1,900 parts by weight of a polypropylene (C).

3. A thermoplastic propylene resin composition according to claim 1, which further comprises a filler (L) in an amount of 0.01 to 300 parts by weight per 100 parts by weight of the thermoplastic propylene resin composition.

4. A thermoplastic propylene resin composition according to claim 3, wherein the unsaturated carboxylic acid or derivative thereof grafted in the graft polypropylene (A) is maleic anhydride.

5. A thermoplastic propylene resin composition according to claim 3, wherein in the graft polypropylene (B), the unsaturated carboxylic acid or derivative thereof grafted is maleic anhydride, and the unsaturated aromatic monomer grafted is styrene.

6. A thermoplastic propylene resin composition according to claim 3, wherein the polyamide resin (F) is a poly-ε-caprolactam or a polyhexamethylene adipamide.

7. A thermoplastic propylene resin composition according to claim 3, wherein the epoxy group containing copolymer (G) is a copolymer of an unsaturated epoxy compound and ethylene, or a terpolymer of an unsaturated epoxy compound, ethylene and an ethylenic unsaturated compound other than ethylene.

8. A thermoplastic propylene resin composition according to claim 3, wherein the rubber material (H) or the starting rubber material for the modified rubber material (I), or both, are ethylenic copolymer rubbers.

9. A thermoplastic propylene resin composition according to claim 1, wherein the unsaturated carboxylic acid or derivative thereof grafted in the graft polypropylene (A) is maleic anhydride.

10. A thermoplastic propylene resin composition according to claim 1, wherein in the graft polypropylene (B), the unsaturated carboxylic acid or derivative thereof grafted is maleic anhydride, and the unsaturated aromatic monomer grafted is styrene.

11. A thermoplastic propylene resin composition according to claim 1, wherein the polyamide resin (F) is a poly-ε-caprolactam or a polyhexamethylene adipamide.

12. A thermoplastic propylene resin composition according to claim 1, wherein the epoxy group containing copolymer (G) is a copolymer of an unsaturated epoxy compound and ethylene, or a terpolymer of an unsaturated epoxy compound, ethylene and an ethylenic unsaturated compound other than ethylene.

13. A thermoplastic propylene resin composition according to claim 12, wherein the rubber material (H) or the starting rubber material for the modified rubber material (I), or both, are ethylenic copolymer rubbers.

14. A thermoplastic propylene resin composition according to claim 1, wherein the rubber material (H) or the starting rubber material for the modified rubber material (I), or both, are selectively-hydrogenated block copolymer rubbers comprising unsaturated aromatic polymer blocks and conjugated diene polymer blocks.

15. A thermoplastic propylene resin composition comprising 100 parts by weight of a graft resin composition (K) obtained by graft copolymerizing an unsaturated carboxylic acid or a derivative thereof and an unsaturated aromatic monomer onto a mixture of 1 to 99% by weight of a polypropylene (C) and 99 to 1% by weight of a rubber material (H), 0.1 to 600 parts by weight of a polyamide resin (F), and 0.1 to 300 parts by weight of an epoxy group containing copolymer (G), the content of the polyamide resin (F) in the thermoplastic propylene resin composition being less than 60% by weight.

16. A thermoplastic propylene resin composition according to claim 15, which further comprises up to 1,900 parts by weight of a polypropylene (C).

17. A thermoplastic propylene resin composition according to claim 15, which further comprises a filler (L) in an amount of 0.01 to 300 parts by weight per 100 parts by weight of the thermoplastic propylene resin composition.

18. A thermoplastic propylene resin composition according to claim 17, wherein in the graft resin composition (K), the unsaturated carboxylic acid or derivative thereof grafted is maleic anhydride, and the unsaturated aromatic monomer grafted is styrene.

19. A thermoplastic propylene resin composition according to claim 17, wherein the polyamide resin (F) is a poly-ε-caprolactam or a polyhexamethylene adipamide.

20. A thermoplastic propylene resin composition according to claim 17, wherein the epoxy group containing copolymer (G) is a copolymer of an unsaturated epoxy compound and ethylene, or a terpolymer of an unsaturated epoxy compound, ethylene and an ethylenic unsaturated compound other than ethylene.

21. A thermoplastic propylene resin composition according to claim 17, wherein the rubber material (H) is an ethylenic copolymer rubber.

22. A thermoplastic propylene resin composition according to claim 17, wherein the filler (L) is at least one member selected from the group consisting of fibers and particles.

23. A thermoplastic propylene resin composition according to claim 22, wherein the filler is at least one member selected from the group consisting of glass fiber, carbon fiber, talc and mica.

24. A thermoplastic propylene resin composition according to claim 15, wherein in the graft resin composition (K), the unsaturated carboxylic acid or derivative thereof grafted is maleic anhydride, and the unsaturated aromatic monomer grafted is styrene.

25. A thermoplastic propylene resin composition according to claim 15, wherein the polyamide resin (F) is a poly-ε-caprolactam or a polyhexamethylene adipamide.

26. A thermoplastic propylene resin composition according to claim 15, wherein the epoxy group containing copolymer (G) is a copolymer of an unsaturated epoxy compound and ethylene, or a terpolymer of an unsaturated epoxy compound, ethylene and an ethylenic unsaturated compound other than ethylene.

27. A thermoplastic propylene resin composition according to claim 15, wherein the rubber material (H) is an ethylenic copolymer rubber.

* * * * *